US010791265B1

(12) United States Patent
Lambert et al.

(10) Patent No.: US 10,791,265 B1
(45) Date of Patent: Sep. 29, 2020

(54) SYSTEMS AND METHODS FOR MODEL-BASED ANALYSIS OF DAMAGE TO A VEHICLE

(71) Applicant: State Farm Mutual Automobile Insurance Company, Bloomington, IL (US)

(72) Inventors: Holly Lambert, Roswell, GA (US); Shane Tomlinson, Bloomington, IL (US); Daniel J. Green, Bloomington, IL (US); Bradley A. Sliz, Deerfield, IL (US); Marigona Bokshi-Drotar, McKinney, TX (US); Holly Kay Sanderson, Bloomington, IL (US); Derek Lawless, Bloomington, IL (US); He Yang, The Colony, TX (US); Jennifer Malia Andrus, Champaign, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 37 days.

(21) Appl. No.: 16/158,118

(22) Filed: Oct. 11, 2018

Related U.S. Application Data

(60) Provisional application No. 62/572,163, filed on Oct. 13, 2017, provisional application No. 62/584,363, filed on Nov. 10, 2017, provisional application No. 62/633,151, filed on Feb. 21, 2018.

(51) Int. Cl.
*H04N 5/232* (2006.01)
*G06K 9/00* (2006.01)
*G06Q 40/08* (2012.01)
*G06Q 10/00* (2012.01)
*G06N 20/00* (2019.01)

(52) U.S. Cl.
CPC ..... *H04N 5/23222* (2013.01); *G06K 9/00671* (2013.01); *G06N 20/00* (2019.01); *G06Q 10/20* (2013.01); *G06Q 40/08* (2013.01)

(58) Field of Classification Search
None
See application file for complete search history.

(56) References Cited

U.S. PATENT DOCUMENTS

| 7,239,350 | B2 | 7/2007 | Ban |
| 9,228,834 | B2 | 1/2016 | Kidd et al. |
| 9,508,200 | B1 | 11/2016 | Mullen et al. |
| 9,824,453 | B1 | 11/2017 | Collins et al. |
| 10,430,886 | B1 * | 10/2019 | Brandmaier ........... G06Q 40/08 |

(Continued)

*Primary Examiner* — James M Hannett
(74) *Attorney, Agent, or Firm* — Armstrong Teasdale LLP

(57) ABSTRACT

A system for capturing images of damage to an object configured to (i) store an orientation model associated with an object; (ii) receive, from a user, a request to analyze damage to the object; (iii) instruct the user to position a camera at a first position relative to the object; (iv) receive an image of the object from the camera; (v) determine whether the received image is properly framed; (vi) if the received image is not properly framed, instruct the user to adjust the position of the camera; and (vii) if the received image is properly framed, instruct the user to position the camera at a second position relative to the object. As a result, obtaining images of sufficient quality for proper processor analysis may be facilitated.

20 Claims, 21 Drawing Sheets

(56) References Cited

U.S. PATENT DOCUMENTS

| | | |
|---|---|---|
| 2009/0138290 A1 | 5/2009 | Holden |
| 2012/0297337 A1 | 11/2012 | St. Denis et al. |
| 2013/0021512 A1 | 1/2013 | Patuck et al. |
| 2015/0106133 A1* | 4/2015 | Smith, Jr. .............. G06Q 40/08 705/4 |
| 2017/0147991 A1 | 5/2017 | Franke et al. |
| 2017/0293894 A1* | 10/2017 | Taliwal ................ G06T 7/0004 |

* cited by examiner

SYSTEMS AND METHODS FOR MODEL-BASED ANALYSIS OF DAMAGE TO A VEHICLE

RELATED APPLICATIONS

This application is related to U.S. Provisional Patent Application No. 62/633,151, filed Feb. 21, 2018, entitled "SYSTEMS AND METHODS FOR MODEL-BASED ANALYSIS OF DAMAGE TO A VEHICLE," U.S. Provisional Patent Application No. 62/572,163, filed Oct. 13, 2017, entitled "SYSTEMS AND METHODS FOR MODEL-BASED ANALYSIS OF DAMAGE TO A VEHICLE," and U.S. Provisional Patent Application No. 62/584,363, filed Nov. 10, 2017, entitled "SYSTEMS AND METHODS FOR MODEL-BASED ANALYSIS OF DAMAGE TO A VEHICLE," the entire contents and disclosure of which are hereby incorporated by reference herein in their entirety.

FIELD OF THE INVENTION

The present disclosure relates to analyzing vehicle damage and, more particularly, to a network-based system and method for capturing images of damage to a vehicle, model-based analysis of damage to the vehicle, and/or estimating a cost to repair the vehicle.

BACKGROUND

In most cases of damage, such as to a vehicle, the damage may be reviewed by an individual, such as an appraiser, to determine a cost to repair the damage. This may require either the owner of the vehicle to transport the vehicle to the appraiser, or the appraiser to travel to the vehicle. Depending on the amount of damage to the vehicle, it may not be worthwhile to require the owner or the appraiser to travel. Furthermore, the damage appraisal process takes time, which may delay the owner receiving the money to have the repairs performed. Conventional techniques may have other drawbacks, inefficiencies, and/or inconveniences as well.

BRIEF SUMMARY

The present embodiments may relate to systems and methods for model-based analysis of damage to a vehicle, and estimating a cost to repair the vehicle. The system may include a damage analysis (DA) computer system, one or more insurance network computer devices, one or more user devices associated with at least one camera, and/or one or more repair facility computer devices. The DA computer system may be associated with an insurance network, or may be merely in communication with an insurance network.

The DA computer system may be configured to: (i) receive, from a user, a request for an estimate to repair an object, which may be a vehicle; (ii) receive a plurality of images of the object to repair, including at least one image of damage to the object; (iii) determine whether the plurality of images properly display the object and the damage by comparing the plurality of images to one or more models; (iv) determine one or more additional images needed if the determination is that the plurality of images do not properly display at least one of the object and the damage; (v) transmit an image request to the user for the one or more additional images, where the image request further includes an angle of, and/or a distance from, the object for each of the one or more additional images; (vi) analyze the plurality of images in comparison to a plurality of models; (vii) determine an amount of damage to the object based upon the analysis; (viii) determine a time to repair the object based upon the amount of damage; (ix) determine whether the time to repair exceeds a first threshold; (x) calculate a cost to repair the object if the time to repair does not exceed the first threshold; (xi) categorize the damage as light damage (or low, minor, not severe or substantial damage) if the time to repair does not exceed the first threshold; (xii) determine whether the time to repair exceeds a second threshold if the time to repair exceeds the first threshold; (xiii) categorize the damage as medium damage if the time to repair does not exceed the second threshold; (xiv) categorize the damage as heavy damage if the time to repair exceeds the second threshold; (xv) instruct the user to take the object to a repair facility for an estimate if the damage is medium damage or heavy damage; (xvi) determine whether the user desires to repair the object if the damage is light damage; (xvii) transfer the cost to repair the object to an account associated with the user if the determination is that the user does not desire to repair the object; (xviii) determine a repair facility to repair the object if the determination is that the user desires to repair the object; (xix) transfer the cost to repair the object to an account associated with the repair facility; (xx) schedule an appointment to repair the object with the repair facility; and/or (xxi) transfer the plurality of images to the repair facility. The computer system may include additional, less, or alternate functionality, including that discussed elsewhere herein.

In one aspect, a computer system for model-based analysis of damage to an object may be provided. The computer system may include at least one processor (and/or associated transceiver) in communication with at least one memory device. The at least one processor (and/or associated transceiver) may be configured or programmed to: (1) receive, from a user, a request for an estimate to repair an object; (2) receive a plurality of images of the object to repair, including at least one image of damage to the object; (3) analyze the plurality of images in comparison to a plurality of models; (4) determine an amount of damage to the object based upon the analysis; and/or (5) determine a time to repair the object based upon the amount of damage to facilitate quickly and accurately estimating damage to the object. The computer system may have additional, less, or alternate functionality, including that discussed elsewhere herein.

In another aspect, a computer-implemented method for model-based analysis of damage to an object may be provided. The method may be implemented on a damage analysis ("DA") computer system including at least one processor in communication with at least one memory device. The method may include: (1) receiving, from a user, a request for an estimate to repair an object; (2) receiving, from the user, a plurality of images of the object to repair, including at least one image of damage to the object; (3) analyzing, by the processor, the plurality of images in comparison to a plurality of models; (4) determining, by the processor, an amount of damage to the object based upon the analysis; and/or (5) determining, by the processor a time to repair the object based upon the amount of damage to facilitate quickly and accurately estimating damage to the object. The method may have additional, less, or alternate functionality, including that discussed elsewhere herein.

In at least one further aspect, at least one non-transitory computer-readable storage media having computer-executable instructions embodied thereon may be provided. When executed by at least one processor, the computer-executable instructions may cause the processor to: (1) receive, from a user, a request for an estimate to repair an object; (2) receive a plurality of images of the object to repair, including at least one image of damage to the object; (3) analyze the plurality of images in comparison to a plurality of models; (4) determine an amount of damage to the object based upon the analysis; and/or (5) determine a time to repair the object based upon the amount of damage to facilitate quickly and accurately estimating damage to the object. The computer-executable instructions may have additional, less, or alternate functionality, including that discussed elsewhere herein.

In another aspect, a computer system for capturing images of damage to an object may be provided. The computer system may include at least one processor (and/or associated transceiver) in communication with at least one memory device. The at least one processor (and/or associated transceiver) may be configured or programmed to: (1) store an orientation model associated with an object; (2) receive, from a user, a request to analyze damage to an object; (3) instruct the user to position a camera at a first position relative to the object; (4) receive an image of the object from the camera; (5) determine whether the received image is properly framed; (6) if the received image is not properly framed, instruct the user to adjust the position of the camera; and/or (7) if the received image is properly framed, instruct the user to position the camera at a second position relative to the object to facilitate capturing the proper images. The computer system may have additional, less, or alternate functionality, including that discussed elsewhere herein.

In a further aspect, a computer-implemented method for capturing images of damage to an object may be provided. The method may be implemented on a damage analysis ("DA") computer system including at least one processor in communication with at least one memory device. The method may include: (1) storing an orientation model associated with an object; (2) receiving, from a user, a request to analyze damage to the object; (3) instructing, by the processor, the user to position a camera at a first position relative to the object; (4) receiving, from the camera, an image of the object; (5) determining, by the processor, whether the received image is properly framed; (6) if the received image is not properly framed, instructing the user to adjust the position of the camera; and/or (7) if the received image is properly framed, instructing the user to position the camera at a second position relative to the object to facilitate capturing the proper images. The method may have additional, less, or alternate functionality, including that discussed elsewhere herein.

In at least one further aspect, at least one non-transitory computer-readable storage media having computer-executable instructions embodied thereon may be provided. When executed by at least one processor, the computer-executable instructions may cause the processor to: (1) store an orientation model associated with an object; (2) receive, from a user, a request to analyze damage to an object; (3) instruct the user to position a camera at a first position relative to the object; (4) receive an image of the object from the camera; (5) determine whether the received image is properly framed; (6) if the received image is not properly framed, instruct the user to adjust the position of the camera; and/or (7) if the received image is properly framed, instruct the user to position the camera at a second position relative to the object to facilitate capturing the proper images. The computer-executable instructions may have additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 12 illustrates a plurality of views of an exemplary user interface for capturing images of the front driver side corner of a vehicle, such as the vehicle shown in FIG. 1 using the system shown in FIG. 4.

FIG. 13 illustrates a plurality of views of an exemplary user interface for capturing images of the front passenger side corner of a vehicle, such as the vehicle shown in FIG. 1 using the system shown in FIG. 4.

FIG. 14 illustrates a plurality of views of an exemplary user interface for capturing images of the rear passenger side corner of a vehicle, such as the vehicle shown in FIG. 1 using the system shown in FIG. 4.

FIG. 15 illustrates a plurality of views of an exemplary user interface for capturing images of the rear driver side corner of a vehicle, such as the vehicle shown in FIG. 1 using the system shown in FIG. 4.

FIG. 16 illustrates a plurality of views of an exemplary user interface for capturing images of the Vehicle Identification Number of a vehicle, such as the vehicle shown in FIG. 1 using the system shown in FIG. 4.

FIG. 17 illustrates a plurality of views of an exemplary user interface for capturing images of the odometer of a vehicle, such as the vehicle shown in FIG. 1 using the system shown in FIG. 4.

FIG. 18 illustrates a plurality of views of an exemplary user interface for capturing images of the point of impact or damage of a vehicle, such as the vehicle shown in FIG. 1 using the system shown in FIG. 4.

FIG. 19 illustrates a plurality of views of an exemplary user interface for capturing a plurality of images of the damage to a vehicle, such as the vehicle shown in FIG. 1 using the system shown in FIG. 4.

FIG. 20 illustrates a plurality of views of an exemplary user interface for reviewing captured images of a vehicle, such as the vehicle shown in FIG. 1 using the system shown in FIG. 4.

FIG. 21 illustrates a plurality of views of an exemplary user interface with a feedback system for capturing images of a vehicle, such as the vehicle shown in FIG. 1 using the system shown in FIG. 4.

Figure 1:
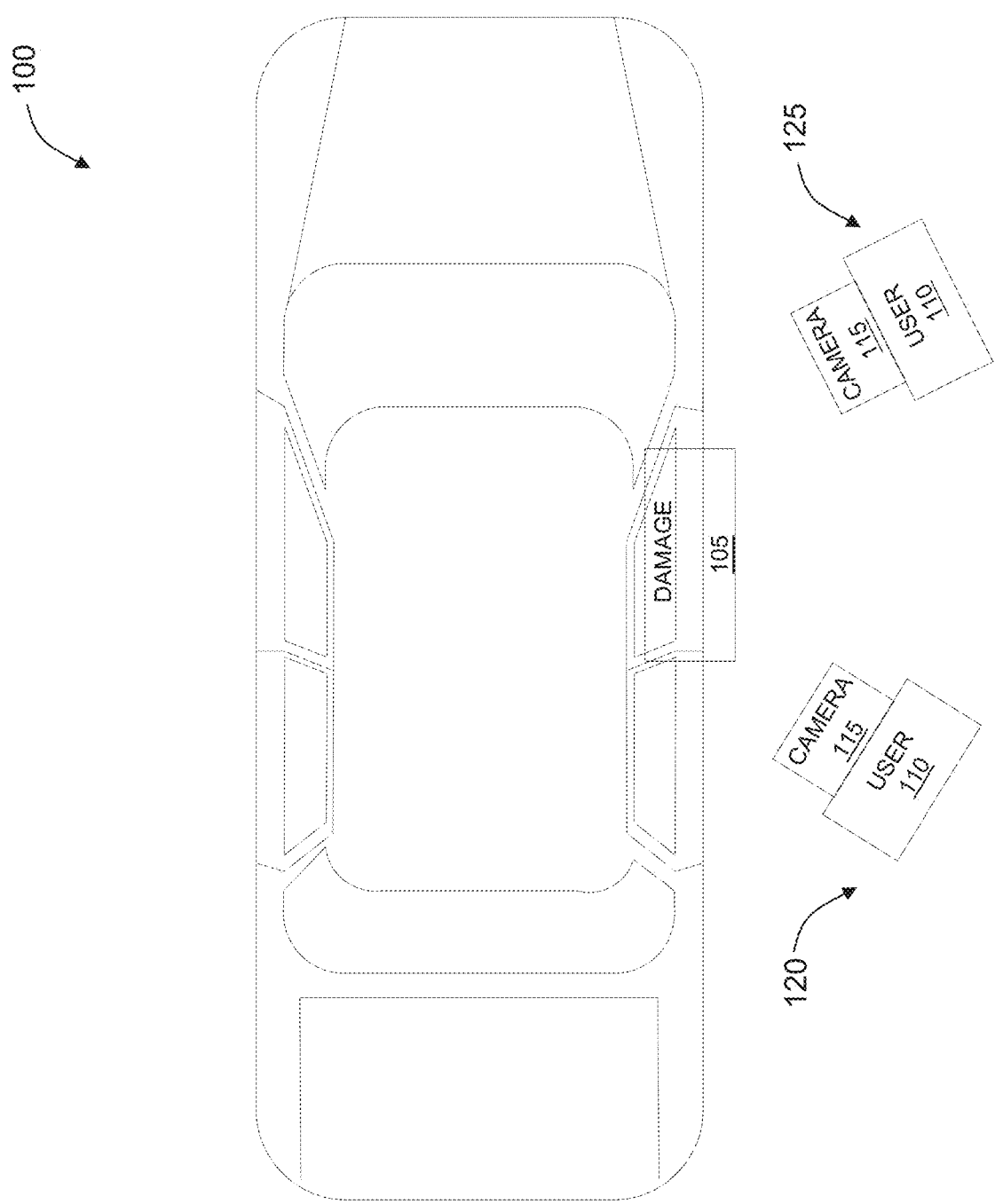
FIG. 1 illustrates a schematic diagram of an exemplary damaged vehicle.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for model-based analysis of damage to a vehicle and estimating a cost to repair the vehicle. In one exemplary embodiment, the process may be performed by a damage analysis ("DA") computer device. In the exemplary embodiment, the DA computer device may be in communication with a user computer device, such as a mobile computer device, an insurer network, and one or more repair facilities.

In the exemplary embodiment, the DA computer device may store a plurality of damage classification models. In the exemplary embodiment, the damage classification models may include models for a plurality of objects, such as a vehicle. The damage classification models may simulate or represent damage to each object, and how the damage would be repaired. The damage classification models may include costs for materials and labor for the repairs based upon the geographic location of the object.

In some embodiments, these costs are updated based upon current supply and demand for parts and/or labor. The damage classification models may be based upon, and updated by, historical repairs and estimations for these repairs. For example, the damage classification models may be updated to account for when an estimate for a repair does not match the actual cost of the repair, such as when the costs significantly exceed the estimate.

In the exemplary embodiment, the damage classification models are updated based upon machine learning as further outlined below. In some embodiments, damage classification models are segregated based upon the type of the object, and the type of damage. For example, a first damage classification model may be for side vehicle impacts, a second damage classification model may be for front-end impacts, and a third damage classification model may be for rear-end impacts. Damage classification models may be further segregated by velocities, number of vehicles involved, types of vehicles involved (e.g., make, model, year), and/or a number of other variables included within vehicle accidents and damage.

In the exemplary embodiment, the damage classification models are configured to analyze damage to an object, such as the vehicle, and classify or categorize the damage into different categories. The damage classification models categorize the damage into light (or low) damage, medium (also known as moderate) damage, and/or heavy damage. In the exemplary embodiment, damage is categorized based upon the amount of time required to repair the damage.

In this example, light or minor damage may be categorized as any damage that will take 25 hours or less to repair. Light damage may be further limited by only requiring up to 5 hours of mechanical repairs, and no damage to the frame of the vehicle. Moderate damage, also known as medium damage, may be categorized as damage requiring up to 49 hours of repairs, where those repairs consist of up to 10 hours of frame damage, up to 12 hours of mechanical repairs and/or up to 14 hours of refinishing. Heavy damage may be categorized as damage requiring more than 49 hours of repairs, over 10 hours of frame damage, over 12 hours of mechanical repairs, and/or over 14 hours of refinishing. These numbers are for example only, and may be adjusted as desired based upon how damage is categorized. In other embodiments, damage may be categorized based upon information about past repairs of objects.

In the exemplary embodiment, the DA computer device may receive, from a user, a request for an estimate to repair an object, such as a vehicle. The request may include additional information about the object, such as, but not limited to, the make and model of the vehicle, the circumstances surrounding the damage, and questions about the current condition of the vehicle. These questions may include, but are not limited to, does the hood open and close freely, does the trunk open and close freely, do all of the doors open and close freely, does the vehicle appear to have any extension damage, and are any fluids leaking. Additionally, the user may indicate whether to not he or she plans to repair the vehicle.

In the exemplary embodiment, the DA computer device may receive a plurality of images of the object to repair. The images may include, but are not limited to, digital photographs, digital scans of analog photographs, raster format image files, vector format image files, and/or digital images generated by a scanning device, such as, but not limited to, a magnetic resonance imaging device, a positron emission tomography device, a radar device, and/or an X-ray device. In the exemplary embodiment, each image of the plurality of images may include a grid of pixels of a variety of colors based upon the object and/or the damage. Each image may also include a plurality of metadata about the image.

The plurality of images may include at least one image of damage to the object. The plurality of images may include images of damage at different positions, such as a first position and a second position. The plurality of images may also include identifying images, such as an image of the vehicle identification number (VIN) and/or an image of the vehicle's license plate to properly identify the vehicle. In some embodiments, the DA computer device determines whether the plurality of images properly display the object and damage.

In the exemplary embodiment, an image properly displays the object and/or damage when the image displays the object and/or damage in appropriate lighting, and at a distance and angle that is sufficient for a human viewer or computer analysis module to analyze the image to gauge the damage. In some embodiments, the image is compared to an orientation model of the object. The orientation model may be a three-dimensional wireframe model of the object that is used to generate views. If the view of the object in the image matches the view of the orientation model of the object, then the image is properly displayed. The DA computer device may analyze the angle, orientation, distance, lighting, colors, and/or reflections contained in the image to determine whether the image is properly displayed.

In further embodiments, the image is properly displayed when the image meets and satisfies an applicable analysis threshold. In these embodiments, the DA computer device may analyze the image to determine whether or not the image contains sufficient data to analyze, such as by comparing to the appropriate damage classification models.

In some embodiments, the DA computer device compares the plurality of images to one or more damage classification models to determine whether the plurality of images properly display the object and damage. The DA computer device may select the damage classification model to use based upon the type of the object and the type of damage. For example, the DA computer device may use a first damage classification model for side vehicle impacts, a second damage classification model for front-end impacts, and a third damage classification model for rear-end impacts. Based upon the comparison, the DA computer device determines whether or not the plurality of images properly display the object and/or damage.

In some embodiments, the DA computer device may determine that one or more additional images are needed if the determination is that the plurality of images do not properly display the object and damage. The DA computer device may transmit an image request to the user for the one or more additional images. The image request may include an angle of and a distance from the object and/or damage for the user to take each of the one or more additional images.

In some embodiments, the DA computer device may instruct the user in how to capture the images for this analysis. In these embodiments, the DA computer device may store a plurality of orientation models of objects. The DA computer device may determine an orientation model of the plurality of orientation models associated with the object based upon the request to analyze damage to the object. For example, the orientation model may be chosen on the type of object to be analyzed.

The DA computer device may determine a plurality of views of the object necessary to analyze the object and/or the damage based upon the orientation model. For example if the damage is on the passenger side of vehicle, then the DA computer device may determine that more views of the passenger side are necessary. The DA computer device may also determine that views of the driver side of the vehicle are unnecessary.

In some embodiments, the plurality of views may include at least one view of an identifier of the object. The identifier may include at least one of a license plate and a vehicle identification number.

The DA computer device may then determine a first view of the plurality of views based upon the damage and the orientation model. The DA computer device may further determine a first position for camera based upon the first view.

The DA computer device may instruct the user to position the camera at the first position relative to the object. For example, the DA computer device may instruct the user to center the camera on the driver's side front corner. In some embodiments, the DA computer device transmits instructions to a user computer device, which will then display the instructions to the user.

In the exemplary embodiment, the DA computer device receives a first image of the object from the camera. In some embodiments, the camera is constantly capturing and transmitting images to the DA computer device. In other embodiments, the camera captures and transmits images to the DA computer device on a periodic basis.

In some embodiments, the camera captures and transmits medium to low quality images. In other embodiments, the camera continuously transmits a video feed to the DA computer device. In still further embodiments, the camera continuously captures images of the object and transmits those images to the DA computer device.

In the exemplary embodiment, the DA computer device determines whether the received first image is properly framed. The DA computer device may determine whether the received first image is properly framed based upon whether or not the image captures the first view.

If the received first image is not properly framed, the DA computer device instructs the user to adjust the position of the camera. If the received first image is properly framed, the DA computer device instructs the user to position the camera at a second position relative to the object. In the exemplary embodiment, the DA computer device may repeatedly receive images from the camera until the received image is properly framed. In this embodiment, the DA computer device 410 may be constantly receiving images from the camera, analyzing those images, and determining whether or not the images are properly framed.

In the exemplary embodiment, the DA computer device or a mobile device may include functionality, instructions, or model that looks to recognize an item or area associated with a vehicle, such as the driver side's front corner, driver side's rear corner, passenger side's front corner, passenger side's rear corner, odometer, VIN (vehicle identification number), and/or points or areas of impact or damage (see also FIGS. 12 to 19). The DA computer device or mobile device may automatically capture images of the items or areas of interest once the DA computer device or mobile device, respectively, determines that photo is "good," such as satisfying one or more image-related criteria or thresholds.

In the exemplary embodiment, the user may press a button or icon on a mobile device, or other DA computer device, to start or initiate the process. After the user initiating action is recognized, the auto process of automatically capturing images of the vehicle may begin. As used herein, "continuous capture" may refer to the user starting the auto image capture process, such as by pressing an icon or button on a mobile device, or giving a voice command recognizable by the mobile device.

Further, in the exemplary embodiment, once capture is initiated by the user, the camera on the mobile device continuously transmits a video feed. Additionally or alternatively, once capture is initiated by the user, the camera on the mobile device continuously captures images of the object (or point or vehicle area of interest) and transmits those images to a remote server for analysis, such as for insurance claim handling.

In the exemplary embodiment, the DA computer device may analyze the plurality of images in comparison to one or more of the plurality of damage classification models. The DA computer device may use the information in the request for an estimate to determine which damage classification model to select. The DA computer device may compare the plurality of images to the selected data classification model.

In the exemplary embodiment, the DA computer device may determine an amount of damage to the object based upon the analysis. The DA computer device may determine a time to repair the object based upon the amount of damage. The DA computer device may categorize damage based upon the analysis and/or the time to repair.

In some embodiments, the DA computer device may determine whether the time to repair exceeds a first threshold. The DA computer device may categorize the damage as light damage if the time to repair does not exceed the first threshold. In the exemplary embodiment, the first threshold may be 25 hours to repair. If the time to repair exceeds the first threshold, the DA computer device may determine whether the time to repair exceeds a second threshold. In the exemplary embodiment, the second threshold may be 49 hours to repair. If the time to repair exceeds the first threshold but not the second threshold, the DA computer device may categorize the damage as medium or moderate damage. If the time to repair exceeds the first threshold and the second threshold, the DA computer device may categorize the damage as heavy damage.

In some embodiments, the DA computer device may calculate a cost to repair the object if the time to repair does not exceed the first threshold and/or the damage is categorized as light damage. In some embodiments, the DA computer device may instruct the user to take the object to a repair facility for an estimate if the damage is medium damage or heavy damage.

In some further embodiments, the DA computer device may determine whether the user desires to repair the object. If the damage is light damage, the DA computer device may transfer the cost to repair the object to an account associated with the user if the user does not desire to repair the object. If the damage is light damage, the DA computer device may determine a repair facility to repair the object if the user desires to repair the object. The DA computer device may transfer the cost to repair the object to an account associated with the repair facility. In some embodiments, the DA computer device may schedule an appointment to repair the object with the repair facility, and/or even direct the vehicle to travel to the repair facility if the vehicle is an autonomous vehicle. The DA computer device may transfer the plurality of images to the repair facility.

Exemplary Vehicle

FIG. 1 depicts a view of an exemplary vehicle 100. In some embodiments, vehicle 100 may be an autonomous or semi-autonomous vehicle capable of fulfilling the transportation capabilities of a traditional automobile or other vehicle. In these embodiments, vehicle 100 may be capable of sensing its environment and navigating without human input. In other embodiments, vehicle 100 may be a "driver-needed" vehicle, such as a traditional automobile that is controlled by a human driver.

As shown in FIG. 1, vehicle 100 may have sustained damage 105 to the passenger side door. A user 110 may be utilizing a camera 115 to capture images of the damage 105 that vehicle 100 sustained. Camera 115 may be a digital camera that is integrated into a mobile computer device, such as smartphone. Camera 115 may also be an independent digital or analog camera. User 110 may utilize camera 115 to capture multiple images of damage 105 from multiple positions, such as first position 120 and second position 125. Each position 120 and 125 may allow user 110 to capture different angled views of damage 105 to allow for a more comprehensive overview of the size of damage 105, the depth of damage 105, and other details about damage that might not be readily visible from only one angle.

While vehicle 100 may be an automobile in the exemplary embodiment, in other embodiments, vehicle 100 may be, but is not limited to, other types of ground craft, aircraft, and watercraft vehicles.

Exemplary Process for Analyzing Damage of an Object

Figure 2:
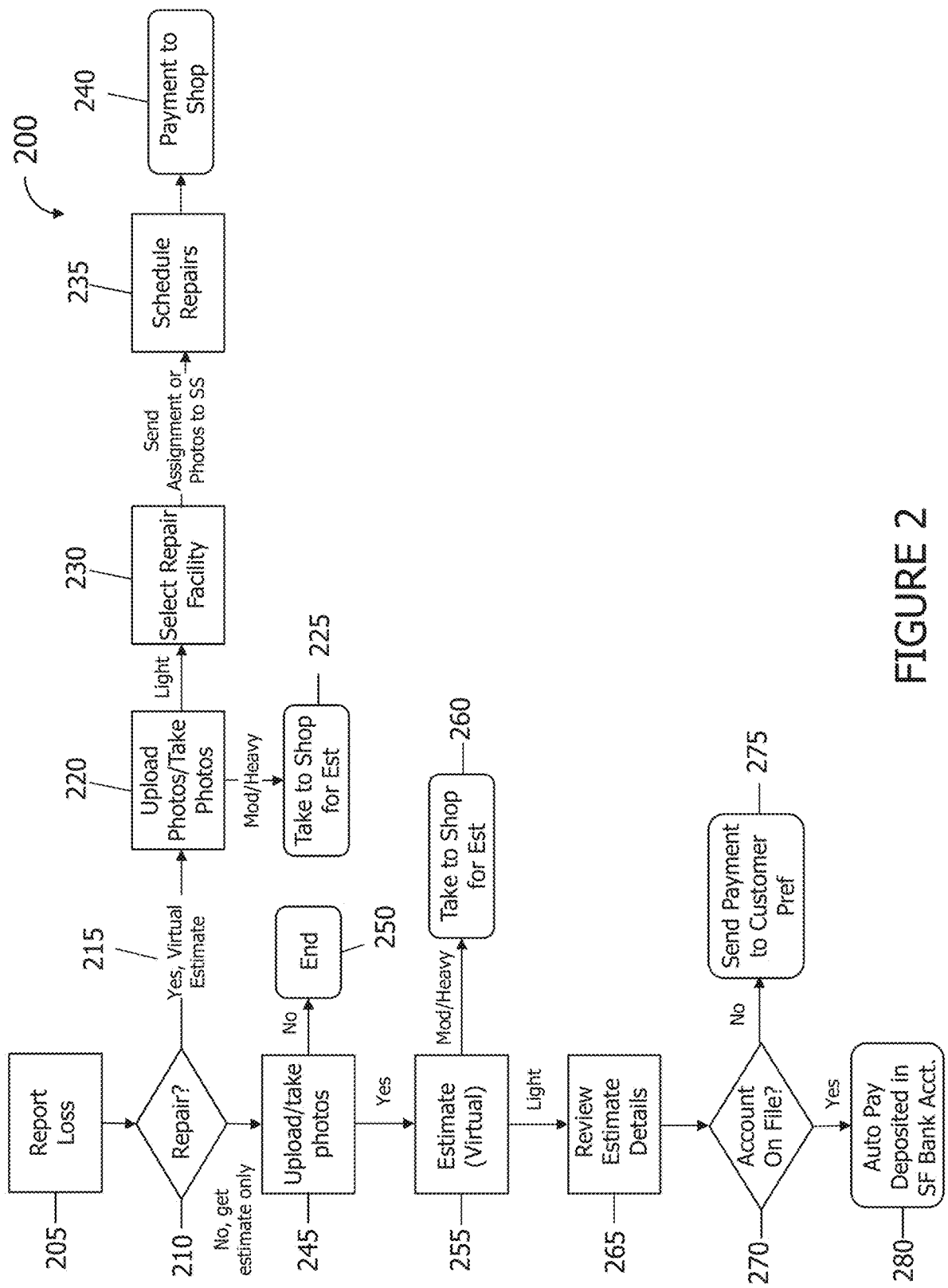
FIG. 2 illustrates a flow chart of an exemplary process of analyzing damage of an object, such as of the vehicle shown in FIG. 1, in accordance with one aspect of the present disclosure.

FIG. 2 illustrates a flow chart of an exemplary process 200 of analyzing damage of an object, such as of vehicle 100 shown in FIG. 1, in accordance with the present disclosure. In the exemplary embodiment, process 200 is performed by a computer device associated with an insurance provider. In other embodiments, process 200 is performed by a computer device in communication with an insurance provider.

In the exemplary embodiment, user 110 (shown in FIG. 1) reports 205 a loss. This loss may be damage 105 (shown in FIG. 1) to vehicle 100 or other object, such as due to a vehicular accident. In other examples, damage 105 may be due to random chance or Mother Nature, such as hail damage or damage from a falling tree limb. In the exemplary embodiment, user 110 utilizes a computer device, such as a mobile computer device, to report 205 the loss. In the exemplary embodiment, user 110 may utilize an application, or website, associated with an insurance provider to report 205 the loss.

In the exemplary embodiment, user 110 enters information about the loss. This information may include, but is not limited to, the make and model of vehicle 100, the circumstances surrounding damage 105, and questions about the current condition of vehicle 100. These questions may include, but are not limited to, does the hood open and close freely, does the trunk open and close freely, do all of the doors open and close freely, does the vehicle appear to have any extension damage, and are any fluids leaking. Additionally, user 110 indicates 210 whether to not he or she plans to repair vehicle 100.

If user 110 desires to repair vehicle 100, the virtual estimate process 215 begins. User 110 uploads 220 the images and/or photographs of vehicle 100 and damage 105.

The images and/or photographs may include, but are not limited to, digital photographs, digital scans of analog photographs, raster format image files, vector format image files, and/or digital images generated by a scanning device, such as, but not limited to, a magnetic resonance imaging device, a positron emission tomography device, a radar device, and/or an X-ray device. In the exemplary embodiment, each image of the plurality of images includes a grid of pixels of a variety of colors based upon the object and/or the damage. Each image may also include a plurality of metadata about the image.

In some embodiments, user 110 is instructed to take the images and/or photos. In some further embodiments, the images and/or photos are analyzed by the application. If the images and/or photos are not sufficient to properly show the damage 105 (e.g., sufficiently for model analysis), then the app may instruct user 110 to take more images and/or photos. For example, if user 110 only uploads images taken from first position 120 (shown in FIG. 1), then user 110 may be instructed to take and upload 220 images from second position 125 (shown in FIG. 2). In some embodiments, the process for uploading 220 images and/or photographs of vehicle 100 and damage 105 is similar to process 900 (shown in FIG. 9). In these embodiments, app may display images similar to the user interface 800 (shown in FIG. 8).

In the exemplary embodiment, an image properly displays the object and/or damage when the image displays the object and/or damage in proper lighting, and at a distance and angle that allows a human viewer or computer analysis module to analyze the image to gauge the damage. In some embodiments, the image is compared to an orientation model of the object. The received images may be compared to an orientation model to determine if the received image captures the first view. If the view of the object in the image matches the view of the orientation model of the object, then the image is properly displayed. The image may be analyzed based upon the angle, orientation, distance, lighting, colors, and/or reflections contained in the image to determine whether the image is properly displayed.

In further embodiments, the image is properly displayed when the image meets and satisfies an applicable analysis threshold. In these embodiments, the image may be analyzed to determine whether or not the image contains sufficient data to analyze, such as by comparing to the appropriate damage classification models.

Using the images and/or photos of damage 105, damage 105 is categorized. In the exemplary embodiment, damage 105 is categorized into one of three categories, light, moderate, and heavy. In other embodiments, there may be a plurality of categories for damage 105. For example, damage may be categorized as cosmetic only. In the exemplary embodiment, damage is categorized based upon the amount of time required to repair the damage.

In this example, light damage may be categorized as any damage that will take 25 hours or less to repair. Light damage may be further limited by only requiring up to 5 hours of mechanical repairs and no damage to the frame of vehicle 100. Moderate damage, also known as medium damage, may be categorized as damage 105 requiring up to 49 hours of repairs, where those repairs consist of up to 10 hours of frame damage, up to 12 hours of mechanical repairs and/or up to 14 hours of refinishing. Heavy damage may be categorized as damage 105 requiring more than 49 hours of repairs, over 10 hours of frame damage, over 12 hours of mechanical repairs, and/or over 14 hours of refinishing. These numbers are for example only, and may be adjusted as desired based upon how damage 105 is categorized. In other embodiments, damage 105 may be categorized based upon information about past repairs of past vehicles.

In the exemplary embodiment, if damage 105 is categorized as either heavy or medium, the app may instruct user 110 to take 225 vehicle 100 to a repair facility for an estimate. In this case, the app stops the virtual estimation process. In some embodiments, the app, at the user's request, transmits the images and/or photos to the repair facility. In some embodiments, the app assists user 110 in setting up an appointment with the repair facility.

In the exemplary embodiment, if damage 105 is categorized as light, the app may request that user 110 select 230 a repair facility to perform repairs on vehicle 100 to repair damage 105. In some embodiments, user 110 already selected the desired repair facility, such as when entering information about the loss in Step 205. The app then may assign the repair to the selected repair facility and may transmit the information about damage 105 provided by user 110 as well as the images and/or photos of damage 105. In the exemplary embodiment, the app may facilitate scheduling 235 the repairs by coordinating with the repair facility and user 110. Once the repairs are scheduled, the app may instigate a transfer of payment to the repair facility to pay for the repairs. In some embodiments, this payment may be stored in an escrow account and released to the repair facility upon completion of the repairs.

If user 110 does not wish to repair damage 105, then the app begins the estimation only process. User 110 uploads 245 the images and/or photographs of vehicle 100 and damage 105. In some embodiments, user 110 is instructed to take the images and/or photos. In some further embodiments, the images and/or photos are analyzed by the application. If the images and/or photos are not sufficient to properly display the damage 105, then the app may instruct user 110 to take more images and/or photos. For example, if user 110 only uploads images taken from first position 120 (shown in FIG. 1), then user 110 may be instructed to take and upload 245 images from second position 125. If user 110 is unable to upload 245 images and/or photos, then the app ends 250 the estimation process. In some embodiments, the process for uploading 245 images and/or photographs of vehicle 100 and damage 105 is similar to process 900 (shown in FIG. 9). In these embodiments, app may display images similar to the user interface 800 (shown in FIG. 8).

In the exemplary embodiment, the app estimates 255 the amount of damage to vehicle 100. Using the images and/or photos of damage 105, damage 105 is categorized. In the exemplary embodiment, damage 105 is categorized into one of three categories, light, moderate, and heavy. In the exemplary embodiment, if damage 105 is categorized as either heavy or medium, the app may instruct user 110 to take 260 vehicle 100 to a repair facility or an appraiser to complete the estimate. In this case, the app stops the estimation only process. In some embodiments, the app, at the user's request, transmits the images and/or photos to the repair facility or the appraiser. In some further embodiments, the app assists user 110 in setting up an appointment with the repair facility or the appraiser.

In the exemplary embodiment, if damage 105 is categorized as light, the app generates an estimate. The app may transmit the details of the estimate to a human appraiser to review 265 the estimate. In other embodiments, the app may review 265 the estimate and may transmit the estimate to a human appraiser if there are any issues or problems. Once the estimate is successfully reviewed, the app may determine 270 if user 110 has an account, such as a bank account, on file. If user 110 does not have an account on file, then the app may initiate a check being transmitted 275 to user 110 for the amount of the estimate. If user 110 has an account on file, then the app may initiate an auto pay 280 into the user's account.

While the above describes the object being a vehicle, the object may be one of any other object that needs to be analyzed to determine the amount of damage that the object has sustained. In some further embodiments, the object may be, but is not limited to, a personal possession or personal article, such as an antique clock, a piece of artwork, and/or a piece of furniture; a residence, such as a house or apartment, or features thereof, such as a roof or siding; and/or a place of business.

Exemplary Computer-Implemented Method for Analyzing Damage of an Object

Figure 3:
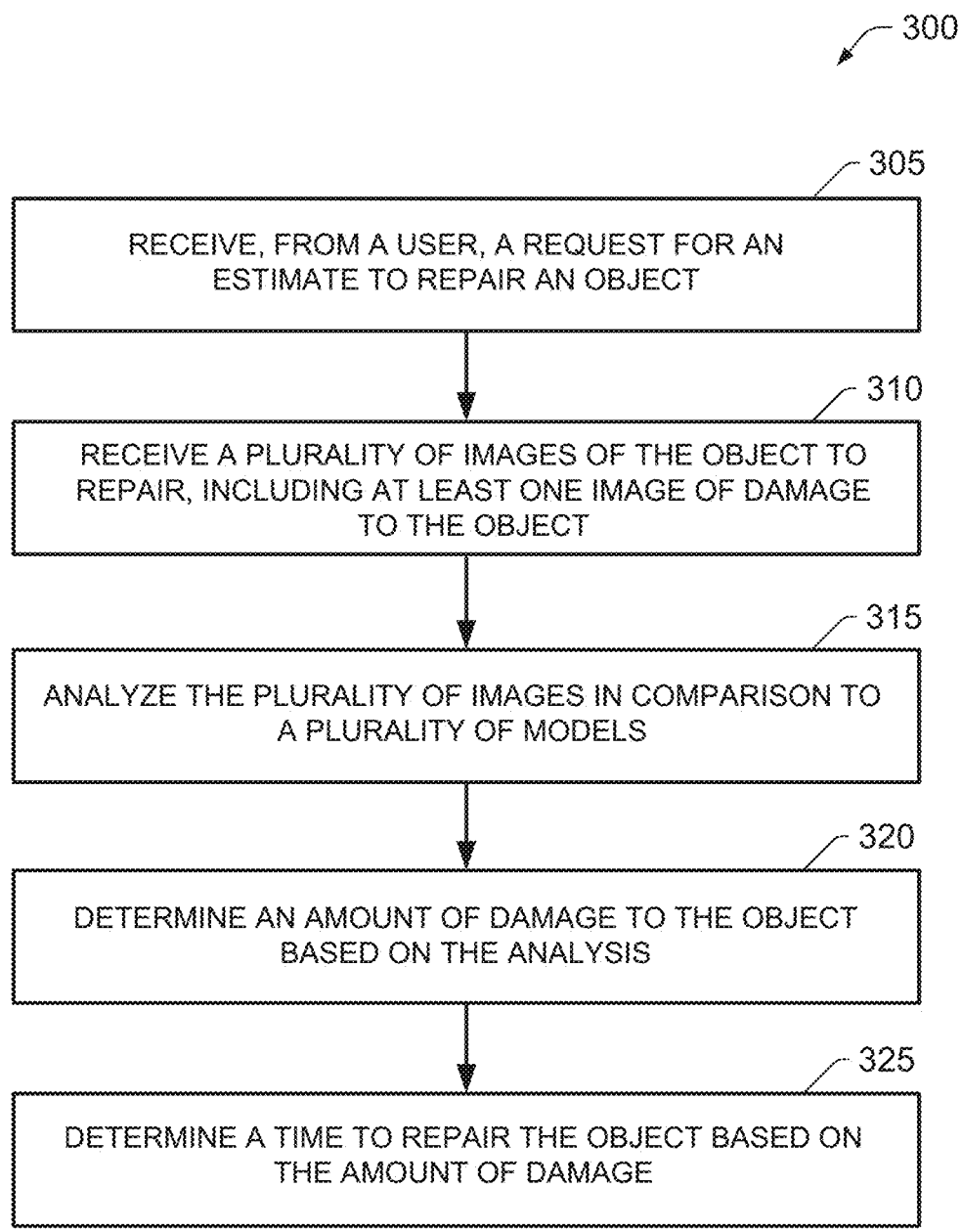
FIG. 3 illustrates a flow chart of an exemplary computer-implemented process for one aspect of the process of analyzing damage of an object as shown in FIG. 2, in accordance with one aspect of the present disclosure.

FIG. 3 illustrates a flow chart of an exemplary computer implemented process 300 for one aspect of process 200 for analyzing damage of an object as shown in FIG. 2. Process 300 may be implemented by a computing device, for example damage analysis ("DA") computer device 410 (shown in FIG. 4). In the exemplary embodiment, DA computer device 410 may be in communication with a user computer device 405 (shown in FIG. 4), such as a mobile computer device, an insurer network 425 (shown in FIG. 4), and one or more repair facilities 430 (shown in FIG. 4).

In the exemplary embodiment, DA computer device 410 may store a plurality of damage classification models. In the exemplary embodiment, the damage classification models may include models for a plurality of objects, such as vehicle 100 (shown in FIG. 1). The damage classification models may simulate damage, such as damage 105 (shown in FIG. 1), to each object and how damage 105 would be repaired. The damage classification models may include costs for materials and labor for the repairs based upon the geographic location of the object. In some embodiments, these costs are updated based upon current supply and demand for parts and/or labor.

In some further embodiments, the damage classification models are based upon, and updated by, historical repairs and estimations for these repairs. For example, the damage classification models may be updated to account for when an estimate for a repair does not match the actual cost of the repair, such as when the costs significantly exceed the estimate.

In the exemplary embodiment, the damage classification models are updated based upon machine learning as further outlined below. In some embodiments, damage classification models are segregated based upon the type of the object and the type of damage. For example, a first damage classification model may be for side vehicle impacts, a second damage classification model may be for front-end impacts, and a third damage classification model may be for rear-end impacts. Damage classification models may be further segregated by velocities, number of vehicles involved, types of vehicles involved (e.g., make, model year), and/or a number of other variables included within vehicle accidents and damage.

In the exemplary embodiment, the damage classification models are configured to analyze damage to an object, such as vehicle 100 and classify or categorize the damage into different categories. In the exemplary embodiment, the damage classification models categorize damage 105 into light damage, medium (also known as moderate) damage, and heavy damage. In the exemplary embodiment, damage is categorized based upon the amount of time required to repair the damage. In this example, light damage may be categorized as any damage that will take 25 hours or less to repair.

Light damage may be further limited by only requiring up to 5 hours of mechanical repairs and no damage to the frame of vehicle 100. Moderate damage, also known as medium damage, may be categorized as damage 105 requiring up to 49 hours of repairs, where those repairs consist of up to 10 hours of frame damage, up to 12 hours of mechanical repairs and/or up to 14 hours of refinishing. Heavy damage may be categorized as damage 105 requiring more than 49 hours of repairs, over 10 hours of frame damage, over 12 hours of mechanical repairs, and/or over 14 hours of refinishing. These numbers are for example only, and may be adjusted as desired based upon how damage 105 is categorized. In other embodiments, damage 105 may be categorized based upon information about past repairs of objects.

In the exemplary embodiment, DA computer device 410 may receive 305, from user 110 (shown in FIG. 1), a request for an estimate to repair an object, such as vehicle 100. The request may include additional information about the object, such as, but not limited to, the make and model of vehicle 100, the circumstances surrounding damage 105, and questions about the current condition of vehicle 100. These questions may include, but are not limited to, does the hood open and close freely, does the trunk open and close freely, do all of the doors open and close freely, does the vehicle appear to have any extension damage, and are any fluids leaking. Additionally, user 110 may indicate whether to not he or she plans to repair vehicle 100.

In the exemplary embodiment, DA computer device 410 may receive 310 a plurality of images of the object to repair. The images may include, but are not limited to, digital photographs, digital scans of analog photographs, raster format image files, vector format image files, and/or digital images generated by a scanning device, such as, but not limited to, a magnetic resonance imaging device, a positron emission tomography device, a radar device, and/or an X-ray device. In the exemplary embodiment, each image of the plurality of images includes a grid of pixels of a variety of colors based upon the object and/or the damage. Each image may also include a plurality of metadata about the image.

The plurality of images may include at least one image of damage 105 to the object. The plurality of images may include images of damage 105 at different positions, such as first position 120 and second position 125 (both shown in FIG. 1). The plurality of images may also include identifying images, such as an image of the vehicle identification number (VIN) and/or an image of the vehicle's license plate to properly identify vehicle 100. In some embodiments, DA computer device 410 determines whether the plurality of images properly display the object and damage 105.

In the exemplary embodiment, an image properly displays the object and/or damage 105 when the image displays the object and/or damage 105 in proper lighting and at a distance and angle that allows a human viewer or computer analysis module to analyze the image to gauge the damage 105. In some embodiments, the image is compared to an orientation model of the object. In some embodiments, the orientation model may be a three-dimensional wireframe model of the object that is used to generate views.

If the view of the object in the image matches the view of the orientation model of the object, then the image is properly displayed. DA computer device 410 may analyze the angle, orientation, distance, lighting, colors, and/or reflections contained in the image to determine whether the image is properly displayed. In further embodiments, the image is properly displayed when the image meets and satisfies an applicable analysis threshold. In these embodiments, DA computer device 410 analyzes the image to determine whether or not the image contains sufficient data to analyze, such as by comparing to the appropriate damage classification models.

In some embodiments, DA computer device 410 compares the plurality of images to one or more damage classification models to determine whether the plurality of images properly display the object and damage 105. In some embodiments, DA computer device 410 selects the damage classification model to use based upon the type of the object and the type of damage. For example, DA computer device 410 may use a first damage classification model for side vehicle impacts, a second damage classification model for front-end impacts, and a third damage classification model for rear-end impacts. Based upon the comparison, DA computer device 410 determines whether or not the plurality of images properly displays the object and damage 105.

In some embodiments, DA computer device 410 may determine that one or more additional images are needed if the determination is that the plurality of images do no properly display the object and damage 105. DA computer device 410 may transmit an image request to user 110 for the one or more additional images. The image request may include an angle of and a distance from the object and/or damage 105 for user 110 to take each of the one or more additional images. In some embodiments, the process for determining that one or more additional images are needed is similar to process 900 (shown in FIG. 9). In these embodiments, app may display images similar to the user interface 800 (shown in FIG. 8).

In the exemplary embodiment, DA computer device 410 may analyze 315 the plurality of images in comparison to one or more of the plurality of damage classification models. DA computer device 410 may use the information in the request for an estimate to determine which damage classification model to select. DA computer device 410 may compare the plurality of images to the selected data classification model.

In the exemplary embodiment, DA computer device 410 may determine 320 an amount of damage to the object based upon the analysis. In the exemplary embodiment, the plurality of damage classification models are generated based upon historical accident data combined with data from repair shops. During the analysis process, DA computer device 410 compares the images to the appropriate damage classification model to determine the amount of damage to the object. DA computer device 410 may recognize the amount of damage from previous accidents.

In some embodiments, the damage classification models may also include simulation data about simulated accidents and damage causing incidents. In still further embodiments, the damage classification models may include data from the National Transportation Safety Board. In some embodiments, DA computer device may simulate the accident based upon the additional information included in the request, the user's answers to questions, and the damage classification models.

In the exemplary embodiment, DA computer device 410 may determine 325 a time to repair the object based upon the amount of damage. DA computer device 410 may categorize damage based upon the analysis and/or the time to repair. In some embodiments, DA computer device 410 may determine whether the time to repair exceeds a first threshold. DA computer device 410 may categorize the damage as light damage if the time to repair does not exceed the first threshold. In the exemplary embodiment, the first threshold may be 25 hours to repair. If the time to repair exceeds the first threshold, DA computer device 410 may determine whether the time to repair exceeds a second threshold. In the exemplary embodiment, the second threshold may be 49 hours to repair. If the time to repair exceeds the first threshold but not the second threshold, DA computer device 410 may categorize the damage as medium or moderate damage. If the time to repair exceeds the first threshold and the second threshold, DA computer device 410 may categorize the damage as heavy damage.

In some embodiments, DA computer device 410 may calculate a cost to repair the object if the time to repair does not exceed the first threshold and/or the damage is categorized as light damage. In some embodiments, DA computer device 410 may instruct user 110 to take the object to a repair facility for an estimate if the damage is medium damage or heavy damage.

In some further embodiments, DA computer device 410 may determine whether user 110 desires to repair the object. If the damage is light damage, DA computer device 410 may transfer the cost to repair the object to an account associated with user 110 if user 110 does not desire to repair the object. If the damage is light damage, DA computer device 410 may determine a repair facility to repair the object if user 110 desires to repair the object. DA computer device 410 may transfer the cost to repair the object to an account associated with the repair facility. In some embodiments, DA computer device 410 may schedule an appointment to repair the object with the repair facility. DA computer device 410 may transfer the plurality of images to the repair facility.

While the above describes the object being a vehicle, the object may be one of any other object that needs to be analyzed to determine the amount of damage that the object has sustained. In some further embodiments, the object may be, but is not limited to, a personal possession or a personal article, such as an antique clock, a piece of artwork, and/or a piece of furniture; a residence, such as a house or apartment, or features thereof, such as a roof or siding; and/or a place of business.

Exemplary Computer Network

Figure 4:
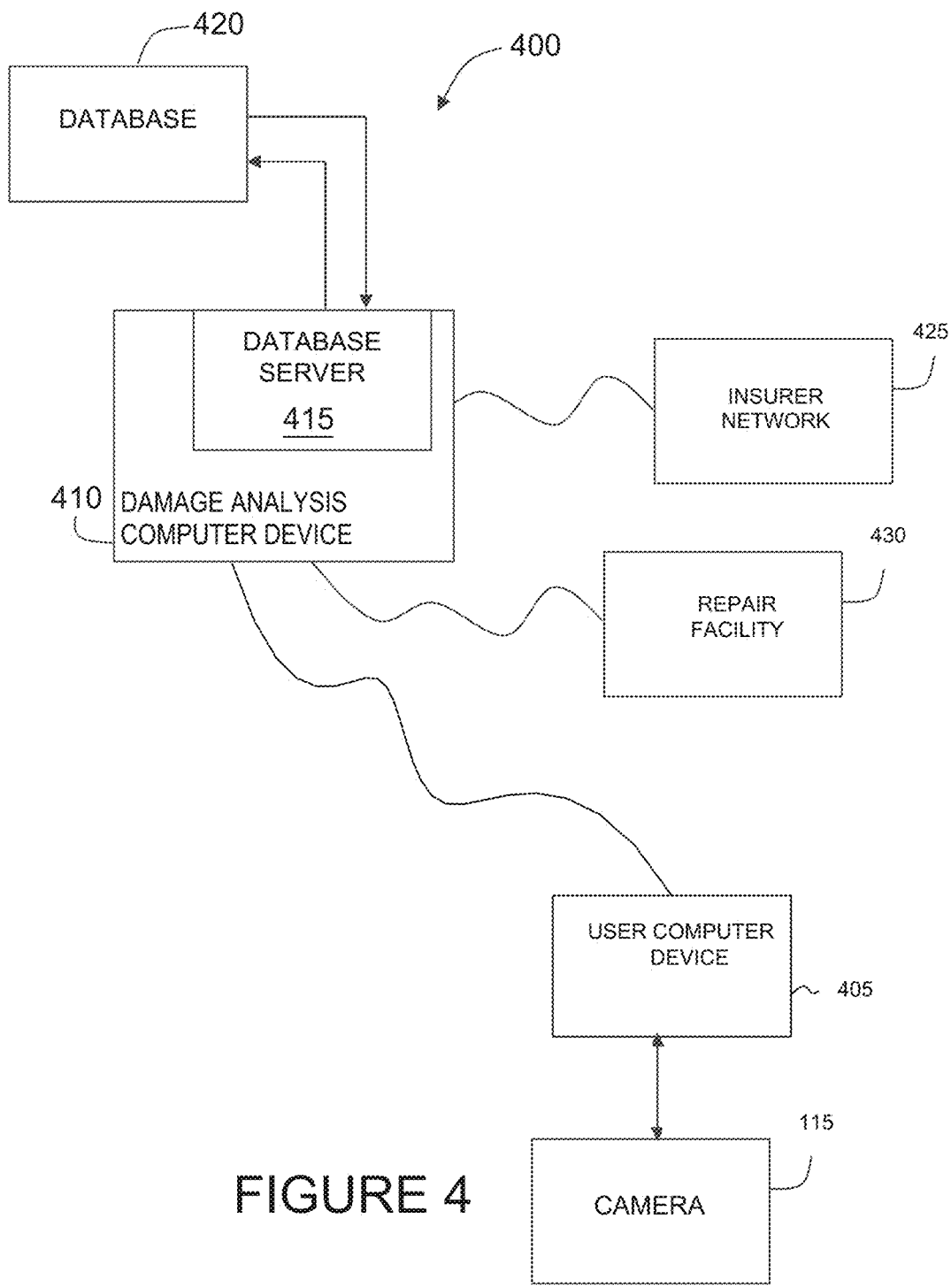
FIG. 4 illustrates a simplified block diagram of an exemplary computer system for implementing the process shown in FIG. 2.

FIG. 4 depicts a simplified block diagram of an exemplary computer system 400 for implementing process 200 shown in FIG. 2. In the exemplary embodiment, computer system 400 may be used for analyzing damage of an object. As described below in more detail, a damage analysis ("DA") computer device 410 may be configured to (i) receive, from a user 110 (shown in FIG. 1), a request for an estimate to repair an object, such as vehicle 100 (shown in FIG. 1); (ii) receive a plurality of images of the object to repair, including at least one image of damage 105 (shown in FIG. 1) to the object; (iii) analyze the plurality of images in comparison to a plurality of models; (iv) determine an amount of damage 105 to the object based upon the analysis; and/or (v) determine a time to repair the object based upon the amount of damage 105.

In the exemplary embodiment, user computer devices 405 are computers that include a web browser or a software application, which enables user computer devices 405 to access remote computer devices, such as DA computer device 410 and insurer network computer devices 425, using the Internet or other network. More specifically, user computer devices 405 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 405 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, user computer device 405 is in communication with camera 115. In some embodiments, camera 115 is integrated into user computer device 405. In other embodiments, camera 115 is a separate device that is in communication with user computer device 405, such as through a wired connection, i.e. a universal serial bus (USB) connection.

A database server 415 may be communicatively coupled to a database 420 that stores data. In one embodiment, database 420 may include the plurality of damage classification models, estimates, images, and repair facility information. In the exemplary embodiment, database 420 may be stored remotely from DA computer device 410. In some embodiments, database 420 may be decentralized. In the exemplary embodiment, user 110 may access database 420 via user computer device 405 by logging onto DA computer device 410, as described herein.

DA computer device 410 may be communicatively coupled with one or more user computer devices 405. In some embodiments, DA computer device 410 may be associated with, or is part of a computer network associated with an insurance provider, or in communication with insurance network computer devices 425. In other embodiments, DA computer device 410 may be associated with a third party and is merely in communication with the insurance network computer devices 425. More specifically, DA computer device 410 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

DA computer device 410 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, DA computer device 410 hosts an application or website that allows user 110 to access the functionality described herein. In some further embodiments, user computer device 405 includes an application that facilitates communication with DA computer device 410.

In the exemplary embodiment, insurer network computer devices 425 include one or more computer devices associated with an insurance provider. In the exemplary embodiment, insurance provider is associated with user 110 and user 110 has an insurance policy that insures the object with insurance provider. In the exemplary embodiment, insurer network computer devices 425 include a web browser or a software application, which enables insurer network computer devices 425 to access remote computer devices, such as DA computer device 410 and database server 415, using the Internet or other network. More specifically, insurer network computer devices 425 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Insurer network computer devices 425 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, insurer network computer devices 425 may access database 420 to update damage classification models and/or review estimates.

In the exemplary embodiment, repair facility computer devices 430 include computer devices associated with repair facilities capable of repairing object. In the exemplary embodiment, repair facility computer devices 430 include a web browser or a software application, which enables repair facility computer devices 430 to access remote computer devices, such as DA computer device 410, using the Internet or other network. More specifically, repair facility computer devices 430 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Repair facility computer devices 430 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, repair facility computer devices 430 may communicate with DA computer device 410 to schedule repair appointments. Repair facility computer devices 430 may communicate with database 420 to retrieve images of damage 105 and information about the loss report.

Exemplary Client Device

Figure 5:
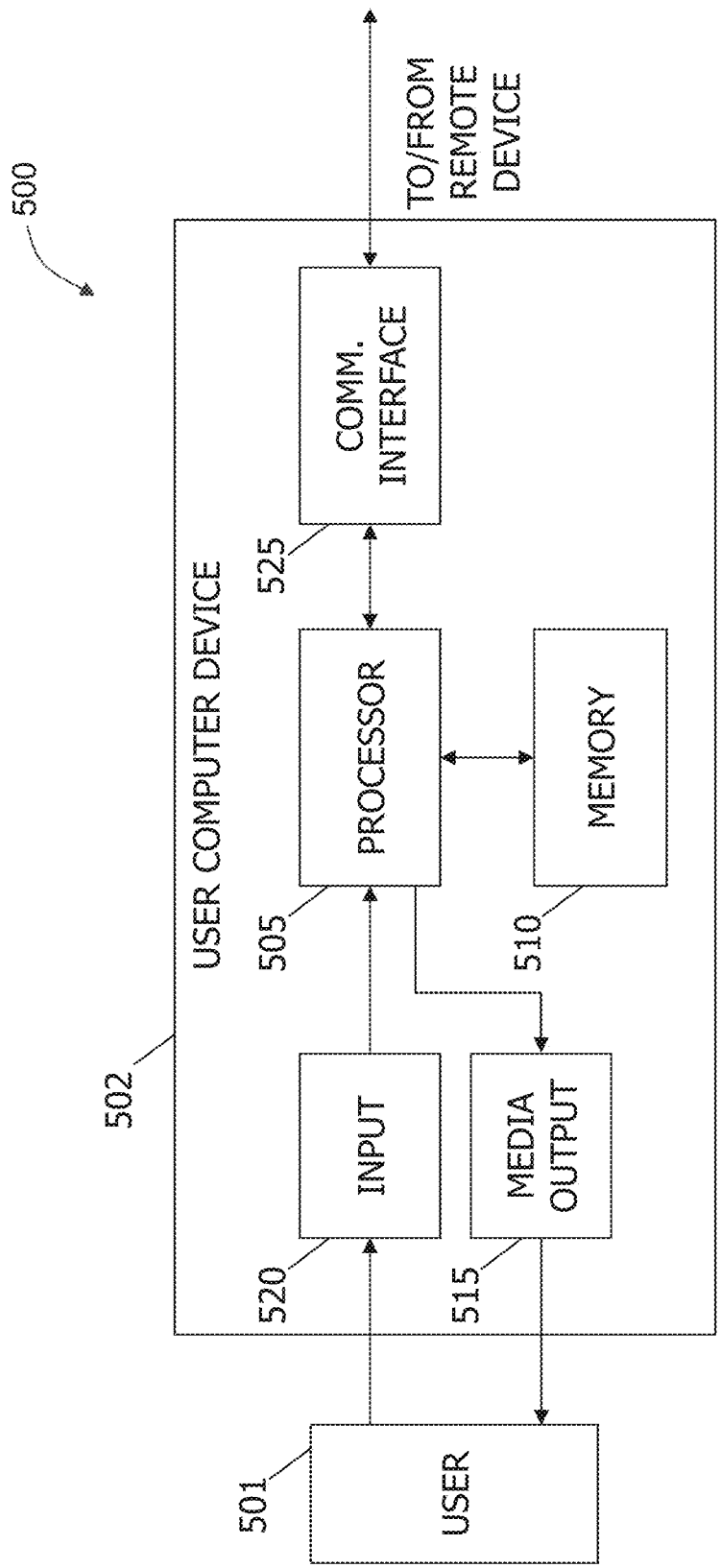
FIG. 5 illustrates an exemplary configuration of a user computer device, in accordance with one aspect of the present disclosure.

FIG. 5 depicts an exemplary configuration 500 of user computer device 502, in accordance with one embodiment of the present disclosure. In the exemplary embodiment, user computer device 502 may be similar to, or the same as, user computer device 405 (shown in FIG. 4). User computer device 502 may be operated by a user 501. User computer device 502 may include, but is not limited to, user computer devices 405, insurer network computer devices 425, and repair facility computer devices 430 (all shown in FIG. 4). User computer device 502 may include a processor 505 for executing instructions. In some embodiments, executable instructions may be stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer readable media.

User computer device 502 may also include at least one media output component 515 for presenting information to user 501. Media output component 515 may be any component capable of conveying information to user 501. In some embodiments, media output component 515 may include an output adapter (not shown) such as a video adapter and/or an audio adapter. An output adapter may be operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501. A graphical user interface may include, for example, an interface for viewing images and repair information. In some embodiments, user computer device 502 may include an input device 520 for receiving input from user 501. User 501 may use input device 520 to, without limitation, select and/or enter one or more items of information about damage 105 (shown in FIG. 1) and/or the object to be repaired.

Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as DA computer device 410 (shown in FIG. 4). Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website from DA computer device 410. A client application may allow user 501 to interact with, for example, DA computer device 410. For example, instructions may be stored by a cloud service, and the output of the execution of the instructions sent to the media output component 515.

Exemplary Server Device

Figure 6:
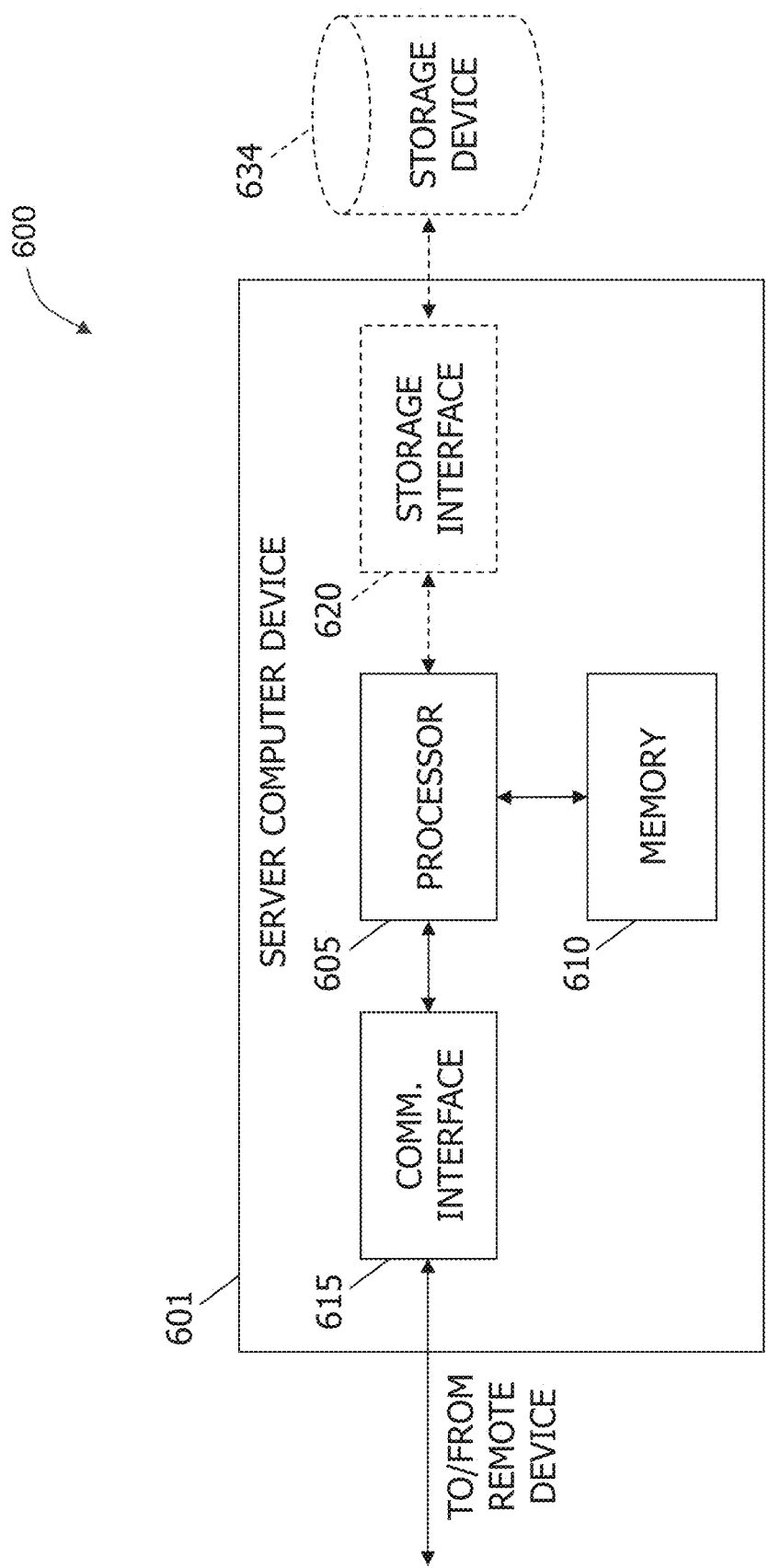
FIG. 6 illustrates an exemplary configuration of a server computer device, in accordance with one aspect of the present disclosure.

FIG. 6 depicts an exemplary configuration 600 of a server computer device 601, in accordance with one embodiment of the present disclosure. In the exemplary embodiment, server computer device 601 may be similar to, or the same as, DA computer device 410 (shown in FIG. 4). Server computer device 601 may include, but is not limited to, DA computer device 410, insurer network computer devices 425, repair facility computer device 430, and database server 415 (all shown in FIG. 4). Server computer device 601 may also include a processor 605 for executing instructions. Instructions may be stored in a memory area 610. Processor 605 may include one or more processing units (e.g., in a multi-core configuration).

Processor 605 may be operatively coupled to a communication interface 615 such that server computer device 601 is capable of communicating with a remote device such as another server computer device 601, DA computer device 410, insurer network computer devices 425, repair facility computer device 430, and user computer devices 405 (shown in FIG. 4) (for example, using wireless communication or data transmission over one or more radio links or digital communication channels). For example, communication interface 615 may receive requests from user computer devices 405 via the Internet, as illustrated in FIG. 4.

Processor 605 may also be operatively coupled to a storage device 634. Storage device 634 may be any computer-operated hardware suitable for storing and/or retrieving data, such as, but not limited to, data associated with database 420 (shown in FIG. 4). In some embodiments, storage device 634 may be integrated in server computer device 601. For example, server computer device 601 may include one or more hard disk drives as storage device 634.

In other embodiments, storage device 634 may be external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 may be operatively coupled to storage device 634 via a storage interface 620. Storage interface 620 may be any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 may execute computer-executable instructions for implementing aspects of the disclosure. In some embodiments, the processor 605 may be transformed into a special purpose microprocessor by executing computer-executable instructions or by otherwise being programmed. For example, the processor 605 may be programmed with the instruction such as illustrated in FIG. 3.

Exemplary Computer Device

Figure 7:
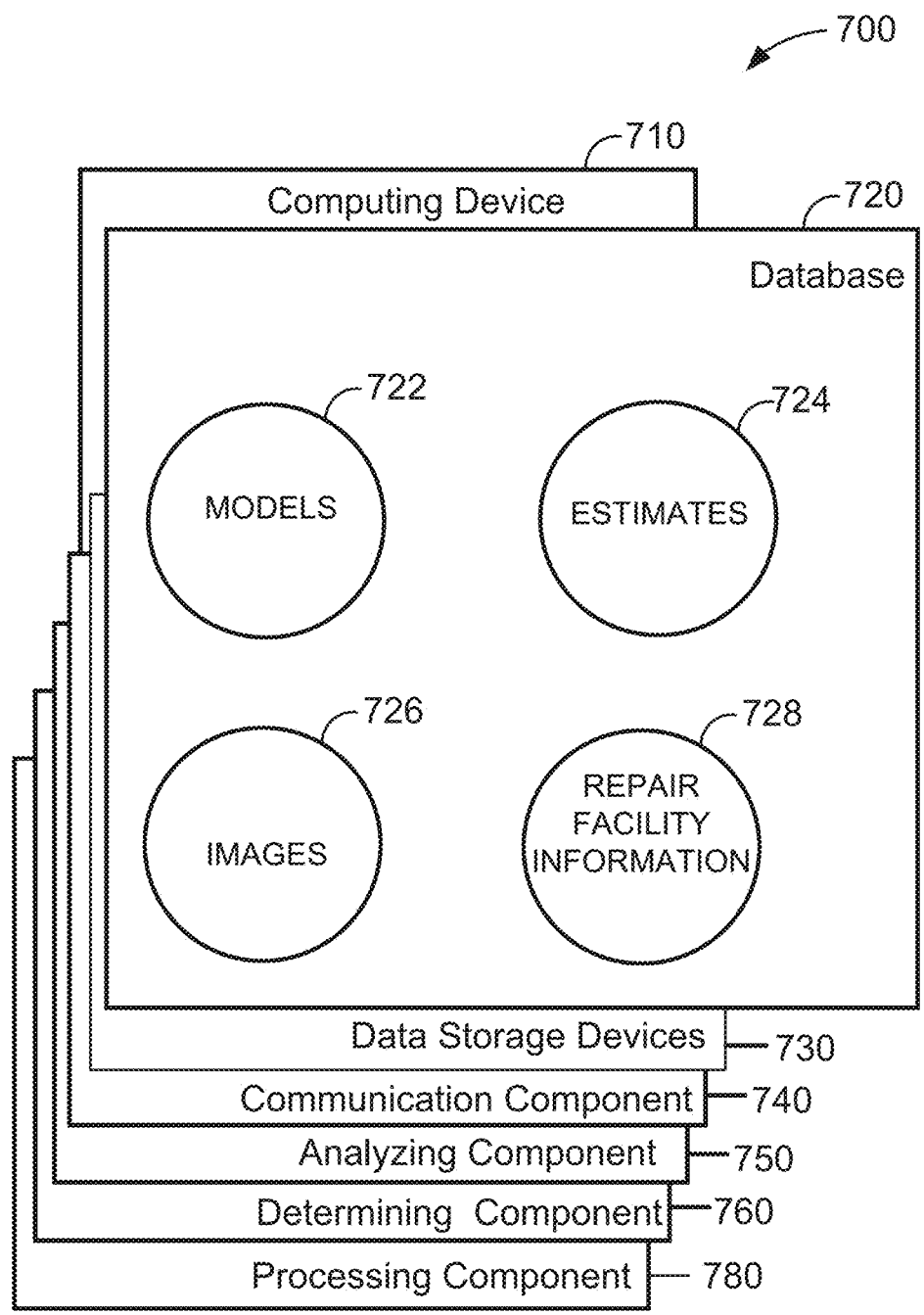
FIG. 7 illustrates a diagram of components of one or more exemplary computing devices that may be used in the system shown in FIG. 4.

FIG. 7 depicts a diagram 700 of components of one or more exemplary computing devices 710 that may be used in system 400 shown in FIG. 4. In some embodiments, computing device 710 may be similar to DA computer device 410. Database 720 may be coupled with several separate components within computing device 710, which perform specific tasks. In this embodiment, database 720 may include the damage classification models 722, estimates 724, images 726, and repair facility information 728. In some embodiments, database 720 is similar to database 420 (shown in FIG. 4).

Computing device 710 may include the database 720, as well as data storage devices 730. Computing device 710 may also include a communication component 740 for receiving 305 a request for an estimate and receiving 310 a plurality of images (both shown in FIG. 3). Computing device 710 may further include an analyzing component 750 for analyzing 315 the plurality of images (shown in FIG. 3). Moreover, computing device 710 may include a determining component 760 for determining 320 an amount of damage and determining 325 a time to repair (both shown in FIG. 3). A processing component 770 may assist with execution of computer-executable instructions associated with the system.

Exemplary User Interface

Figure 8:
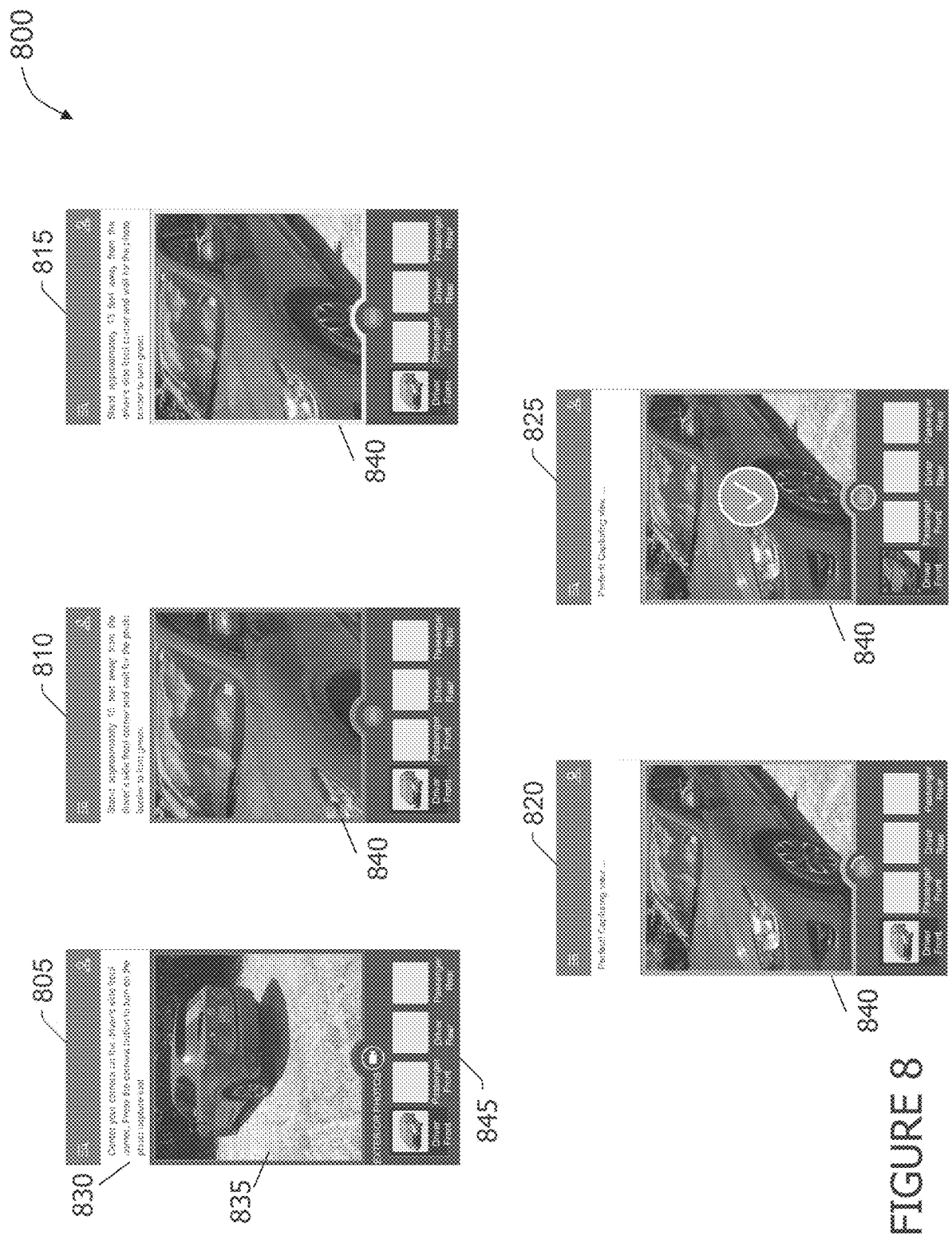
FIG. 8 illustrates a plurality of views of an exemplary user interface for capturing images of the damage to an object, such as the vehicle shown in FIG. 1 using the system shown in FIG. 4.

FIG. 8 illustrates a plurality of views of a user interface 800 for capturing images of the damage to an object, such as vehicle 100 (shown in FIG. 1) using system 400 (shown in FIG. 4). In the exemplary embodiment, user interface 800 is displayed on user computer device 405 (shown in FIG. 4).

In the exemplary embodiment, user interface 800 may include instructions 830 to the user, a live camera view 835, at least one feedback indicator 840, and one or more selected camera views 845.

A first view 805 of user interface 800 contains instructions 830 to the user. In first view 805, these instructions 830 tell the user, such as user 110 (shown in FIG. 1) how to begin the process of capturing images of the damage to an object. As shown in first view 805, the instructions 830 instruct user 110 to proceed to center the camera on the driver's front corner of vehicle 100 and press the button to begin. In the exemplary embodiment, user 110 presses the button only once to start the process of capturing images. In this embodiment, the user 110 presses the button and moves the camera 115 to different positions as described herein.

A second view 810 illustrates what occurs after the user presses the button to begin the process. As shown in second view 810, user 110 has aimed camera 115 at driver's front corner of vehicle 100. In this embodiment, second view 810 displays new instructions 830, instructing user 110 to stand 15 feet away from the front driver's corner of vehicle 100 and wait for the feedback indicator 840 to turn green. In this view 810, the feedback indicator 840 is red, because user 110 and camera 115 are too close to vehicle 100 for a properly framed view.

A third view 815 illustrates what occurs as user 110 backs away from vehicle 100 to comply with the instructions 830. As shown in third view 815, feedback indicator is yellow. This provides feedback to user 110 that the camera view 835 is improving, but is not properly framed yet. In some embodiments, DA computer device 410 or user computer device 405 compares the live camera view 835 with an orientation model to determine whether or not the live camera view 835 is showing the properly framed image. In some embodiments, the orientation model may be a three-dimensional wireframe model of a vehicle that is used to generate views of the object. If the view of the object in the image matches the view of the orientation model of the object, then the image is properly framed.

A fourth view 820 and a fifth view 825 illustrate what occurs when the user 110 positions camera 115 at the proper position so that live camera view 835 displays the properly framed image. In some embodiments, camera 115 may be constantly taking low quality pictures, which are being displayed in live camera view 835. In other embodiments, camera 115 may continuously capture high quality images and/or video necessary for analysis. In these embodiments, camera 115 may capture a high quality picture when camera 115 is pointed at the right angle and at the correct position. In these embodiments, instructions 830 may instruct the user 110 to wait while the picture and/or image is being captured. For example, feedback indicator 840 turns green to show that the user 110 is at the correct position. Feedback indicator 840 then shows a large check mark when the process of capturing the image is complete. In some embodiments, a thumbnail of the captured image may be shown in the one or more selected camera views 845, as shown in fifth view 825.

After the first of the selected camera views 845 is captured, the instructions 830 may instruct the user 110 to proceed to the next position for the next camera view. In some embodiments, these positions may be similar to first position 120 and second position 125 (both shown in FIG. 1).

While the above describes the object being a vehicle, the object may be one of any other object that needs to be analyzed to determine the amount of damage that the object has sustained. In some further embodiments, the object may be, but is not limited to, a personal possession, such as an antique clock, a piece of artwork, and/or a piece of furniture; a residence, such as a house or apartment; and/or a place of business.

Exemplary Computer-Implemented Method for Analyzing Damage of an Object

Figure 9:
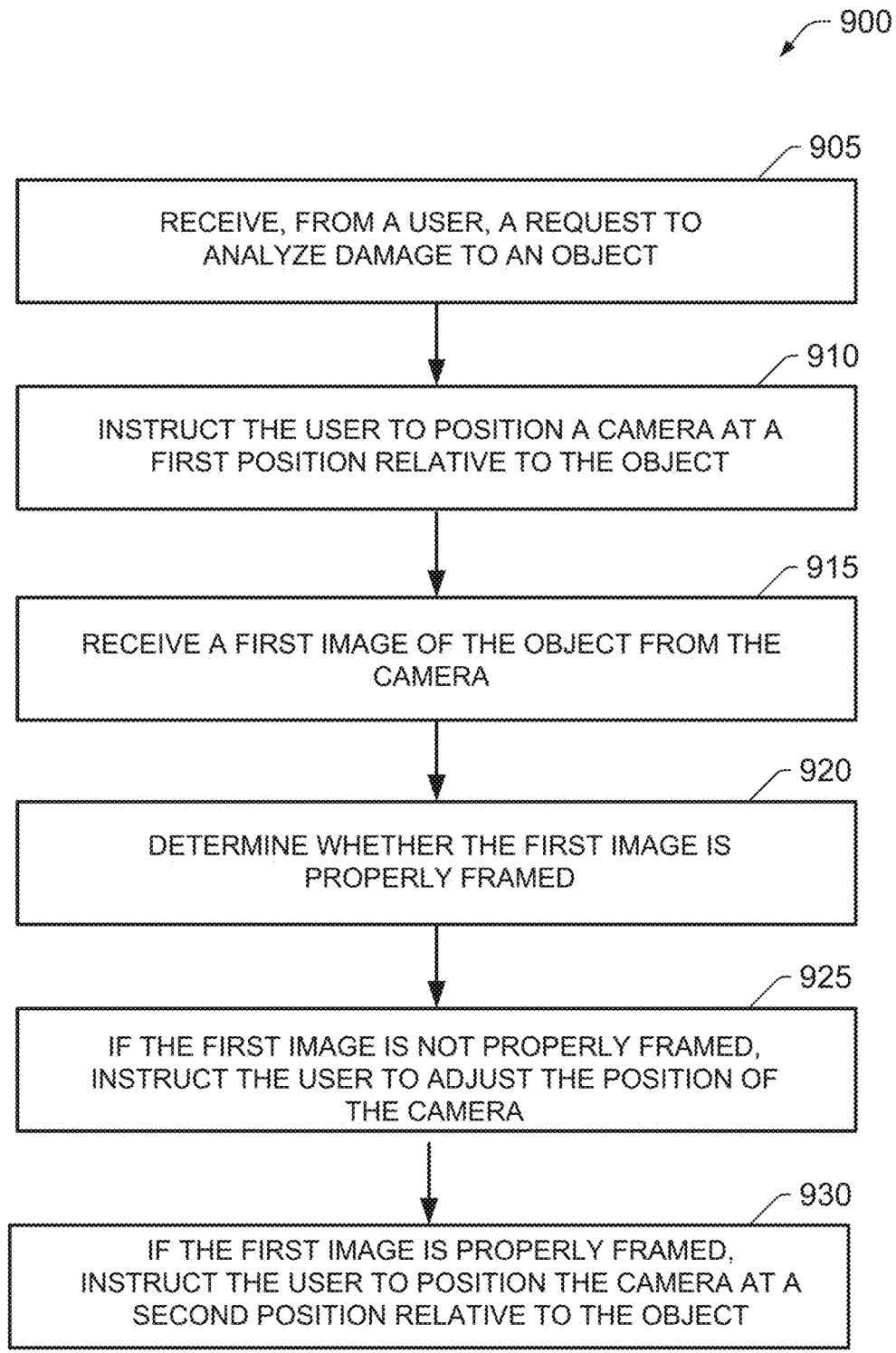
FIG. 9 illustrates a flow chart of an exemplary computer-implemented process for one aspect of capturing images of the damage to an object using the system shown in FIG. 4.

FIG. 9 illustrates a flow chart of an exemplary computer-implemented process 900 for one aspect of capturing images of the damage to an object using system 400 (shown in FIG. 4). Process 900 may be implemented by a computing device, for example damage analysis ("DA") computer device 410 (shown in FIG. 4) or user computer device 405 (shown in FIG. 4). In some embodiments, process 900 is performed by DA computer device 410, where DA computer device 410 communicates to the user, such as user 110 (shown in FIG. 1) through user computer device 405. In the exemplary embodiment, user computer device 405 is in direct communication with camera 115 (shown in FIG. 1). In the exemplary embodiment, user computer device 405 is a mobile computer device with a camera 115 (shown in FIG. 1) that the user 110 may move from position to position, such as position 120 and 125 (shown in FIG. 1), around the object.

In the exemplary embodiment, DA computer device 410 may receive 905, from user 110, a request to analyze damage to an object, such as vehicle 100 (shown in FIG. 1). In some embodiments, the request to analyze damage to the object may include at least one of a type of the object, a model of the object, one or more identifying pieces of data about the object, and one or more identifying pieces of data about user 110. In embodiments where the object is vehicle 100, the request to analyze damage to the object may include one or more of a make of the vehicle, a model of the vehicle, a location of the damage on the vehicle, identification of the vehicle, and identification of user 110.

In some embodiments, DA computer device 410 may store a plurality of orientation models of objects. DA computer device 410 may determine an orientation model of the plurality of orientation models associated with the object based upon the request to analyze damage to the object. For example, the orientation model may be chosen on the type of object to be analyzed. In some embodiments, the orientation model may be a three-dimensional wireframe model of a vehicle that is used to generate views of the object. DA computer device 410 may determine a plurality of views of the object necessary to analyze the object and/or the damage based upon the orientation model. For example if the damage is on the passenger side of vehicle, then DA computer device 410 may determine that more views of the passenger side are necessary. DA computer device 410 may also determine that views of the driver side of vehicle 100 are unnecessary. In some embodiments, the plurality of views may include at least one view of an identifier of the object. The identifier may include at least one of a license plate and a vehicle identification number.

DA computer device 410 may then determine a first view of the plurality of views based upon the damage and the orientation model. DA computer device 410 may further determine the first position 120 for camera 115 based upon the first view.

DA computer device 410 instructs 910 user 110 to position camera 115 at the first position 120 relative to the object. For example, DA computer device 410 may instruct 910 user 110 to center camera 115 on the driver's side front corner. In some embodiments, DA computer device 410 transmits instructions, such as instructions 830 (shown in FIG. 8) to user computer device 405, which will then display instructions 830 to user 110.

In the exemplary embodiment, DA computer device 410 receives 915 a first image of the object from camera 115. In some embodiments, camera 115 is constantly capturing and transmitting images to DA computer device 410. In other embodiments, camera 115 captures and transmits images to DA computer device 410 on a periodic basis. In some embodiments, camera 115 captures and transmits medium to low quality images. In other embodiments, camera 115 continuously transmits a video feed to DA computer device 410. In still further embodiments, camera 115 continuously captures images of the object and transmits those images to DA computer device 410.

In the exemplary embodiment, DA computer device 410 determines 920 whether the received first image is properly framed. DA computer device 410 may determine whether the received first image is properly framed based upon whether or not the image captures the first view.

In the exemplary embodiment, an image properly frames the object and/or damage when the image displays the object and/or damage in proper lighting and at a distance and angle that is sufficient for a human viewer or computer analysis module to analyze the image to gauge the damage. In some embodiments, the image is compared to an orientation model of the object. In some embodiments, DA computer device 410 may compare the received image with the orientation model to determine if the received image captures the first view. If the view of the object in the image matches the view of the orientation model of the object, then the image is properly framed. DA computer device 410 may analyze the angle, orientation, distance, lighting, colors, and/or reflections contained in the image to determine whether the image is properly framed. In further embodiments, the image is properly framed when the image meets and satisfies an applicable analysis threshold. In these embodiments, DA computer device 410 analyzes the image to determine whether or not the image contains sufficient data to analyze, such as by comparing to the appropriate damage classification models. In some embodiments, DA computer device 410 may store an overlay that is displayed on a display screen of user computer device 405. The overlay may include a wireframe view of the object at the angle and position that illustrate the first view. The user would then move the position of the camera 415 until the image matches the overlay. In some embodiments, DA computer device 410 compares the first image to the overlay. In some further amendments, the DA computer device 410 considers the image properly framed, when a predetermined percentage of the object is within the overlay.

If the received first image is not properly framed, DA computer device 410 instructs 925 user 110 to adjust the position of camera 115. If the received first image is properly framed, DA computer device 410 instructs 930 user 110 to position camera 115 at a second position 125 relative to the object. In the exemplary embodiment, DA computer device 410 may repeatedly receive images from camera 115 until the received image is properly framed. In this embodiment, DA computer device 410 may repeat steps 910 through 925 until a properly framed image is received. In some embodiments, DA computer device 410 is constantly receiving images from camera 115, analyzing those images, and determining whether or not the images are properly framed.

In some embodiments, DA computer device 410 may determine an amount of variation between the received image and the first view. DA computer device 410 may provide feedback to the user based upon the amount of variation, such as through feedback indicator 840 (shown in FIG. 8). In these embodiments, DA computer device 410 may continuously provide positive feedback if the image is properly framed and negative feedback if the image is not properly framed.

In some embodiments, DA computer device 410 may store one or more damage classification models. DA computer device 410 may determine the plurality of views of the object necessary to analyze the object and/or the damage based upon the orientation model and the one or more damage classification models.

While the above describes the object being a vehicle, the object may be one of any other object that needs to be analyzed to determine the amount of damage that the object has sustained. In some further embodiments, the object may be, but is not limited to, a personal possession or personal article, such as an antique clock, a piece of artwork, and/or a piece of furniture; a residence, such as a house or apartment, or features thereof, such as a roof or siding; and/or a place of business.

In some embodiments, the user computer device 405 temporarily stores the images from the camera 415 until one image is properly framed. Then that image is stored in the user computer device 405 or transmitted to the DA computer device 410 for storage. The rest of the images are discarded to save space. When all of the images at all of the desired views have been captured, the DA computer device 410 allows the user to review the images to determine if the user wishes to retake any of the images. If the user decides to retake an image, the DA computer device 410 re-instructs the user as if the user was taking the image for the first time. Once the user approves the images, the DA computer device 410 stores all of the images with the virtual estimate, such as in Steps 220 or 245 of Process 200 (shown in FIG. 2). In some embodiments, if the user quits the application before uploading the photos to the virtual estimate, then all of the photos are deleted and the session is ended. This is to prevent or limit fraud so that the image are all taken within a certain period of time of each other. The metadata associated with each image may be checked to confirm that all of the images were taken at the same time or in the same session. In some embodiments, during the photo session, the images are saved locally by the user computer device 405. In other embodiments, during the photo session, the images are temporarily saved in DA computer device 410.

Figure 10:
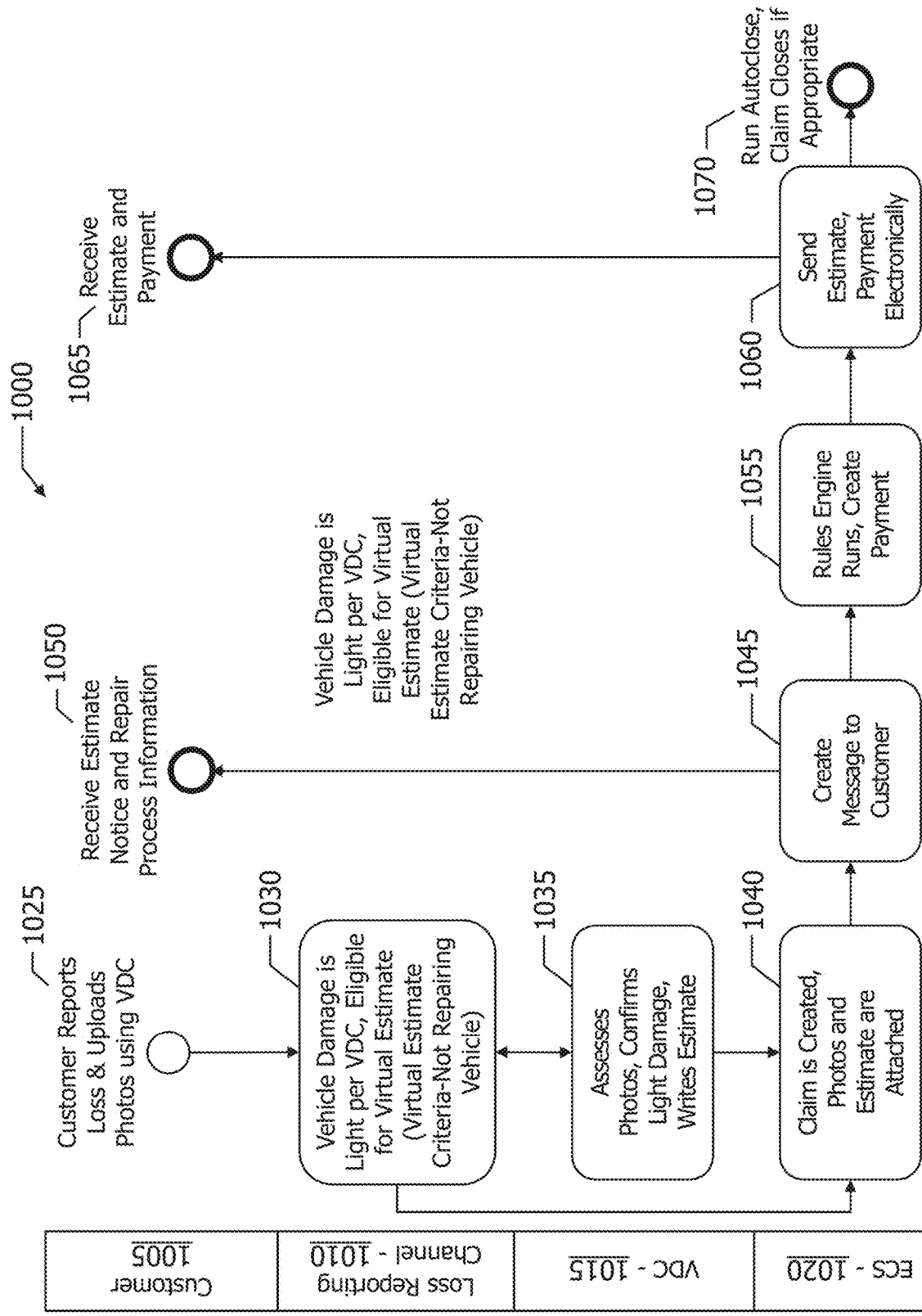
FIG. 10 illustrates a flow chart of an exemplary process of analyzing damage of an object where the user is not repairing the vehicle, such as of the vehicle shown in FIG. 1, in accordance with one aspect of the present disclosure.

Exemplary Process for Analyzing Damage of an Object and Paying an Estimate Based on the Damage FIG. 10 illustrates a flow chart of an exemplary process 1000 of analyzing damage of an object and paying an estimate based on the damage, such as of vehicle 100 shown in FIG. 1, in accordance with the present disclosure. In the exemplary embodiment, process 1000 is performed by a computer device associated with a customer 1005, such as user computer device 405 shown in FIG. 4, a loss reporting channel 1010, such as one or more insurer network computer devices 425 shown in FIG. 4, a vehicle damage classifier (VDC) 1015 such as DA computer device 410 shown in FIG. 4, and an estimated claim service or estimated claim system (ECS) 1020. In some embodiments, the ECS 1020 is associated with insurer network 425 and in some further embodiments the ECS 1020 is an insurer network computer device 425.

In the exemplary embodiment, the customer 1005 reports 1025 a loss and uploads photos using the VDC 1015. In some embodiments, customer 1005 uploads photos in accordance with process 900 shown in FIG. 9. The loss reporting channel 1010 determines 1030 that the damage is light and that the vehicle is eligible for virtual estimate. In some embodiments, the loss reporting channel 1010 also determines that customer 1005 does not desire to repair the vehicle. The loss reporting channel 1010 transmits the photos and other information to the VDC 1015 and the ECS 1020.

The VDC 1015 analyzes 1035 the photos and other information to confirm that the vehicle damage is light. The VDC 1015 then writes an estimate for the damage. The VDC 1015 transmits the estimate to the ECS 1020. The ECS 1020 creates 1040 a claim based on the photos and the estimate. The ECS 1020 creates 1045 a message to the customer 1005. The customer 1005 receives 1050 an estimate notice and repair process information. In some embodiments, the customer 1005 may determine whether or not to repair the vehicle based on this information. The ECS 1020 runs 1055 a rules engine to analyze the claim and create a payment. The ECS 1020 sends 1060 the estimate and the payment electronically to the customer 1005. The customer 1005 receives 1065 the estimate and the payment. The ECS 1020 runs 1070 an autoclose process to close the claim if appropriate.

Figure 11:
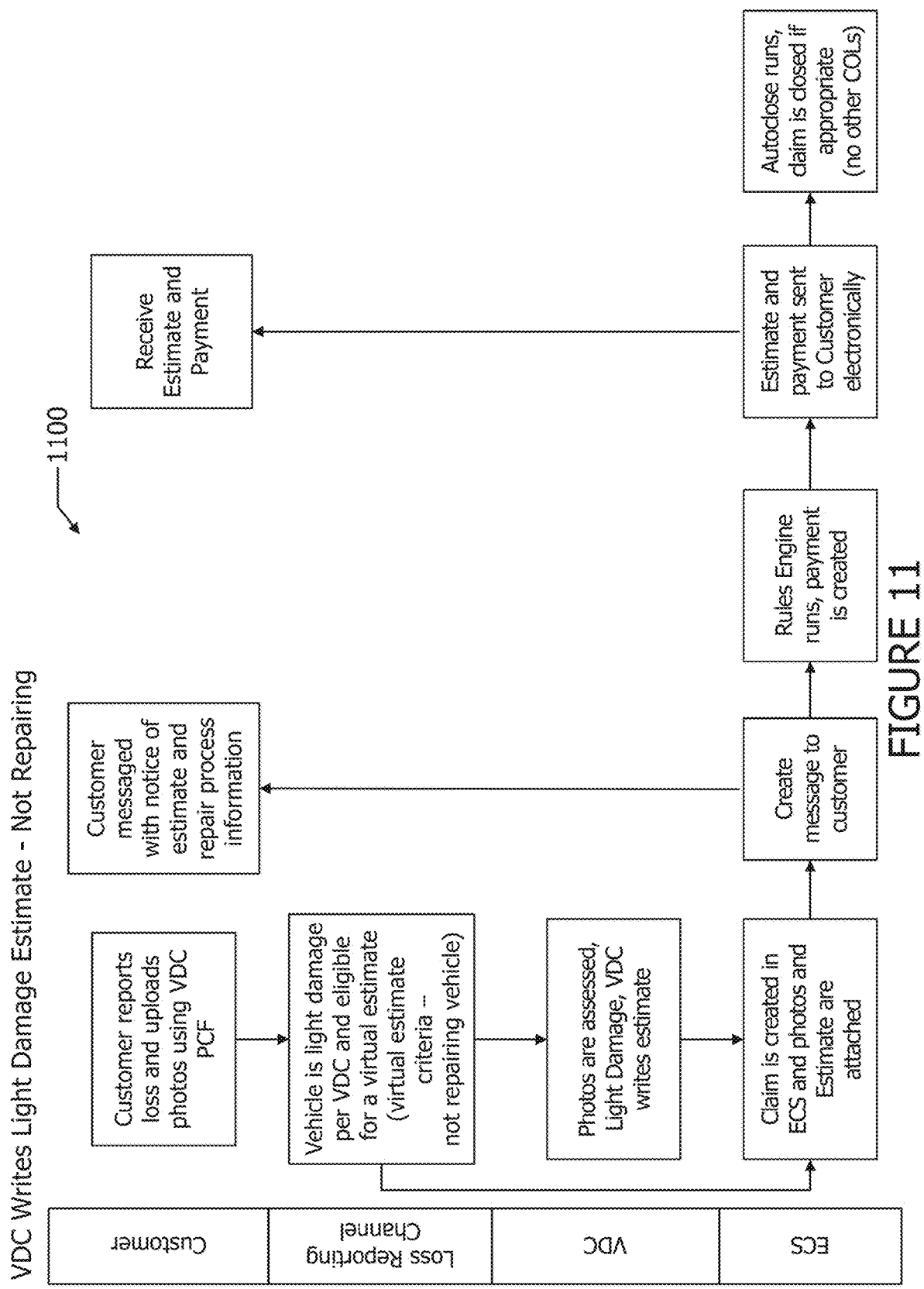
FIG. 11 illustrates a flow chart of another exemplary process of analyzing damage of an object where the user is not repairing the vehicle, such as of the vehicle shown in FIG. 1, in accordance with one aspect of the present disclosure.

Exemplary Process for Analyzing Damage of an Object and Paying an Estimate Based on the Damage FIG. 11 illustrates a flow chart of another exemplary process 1100 of analyzing damage of an object and paying an estimate based on the damage, such as of vehicle 100 shown in FIG. 1, in accordance with the present disclosure. In the exemplary embodiment, process 1100 may be performed by a computer device associated with a customer, a loss reporting channel, a vehicle damage classifier (VDC), and an estimated claim system (ECS). In some embodiments, the ECS is associated with an insurance provider.

In the exemplary embodiment, the customer reports a loss and uploads photos using the VDC. The loss reporting channel determines that the damage is light and that the vehicle is eligible for virtual estimate. In some embodiments, the loss reporting channel also determines that the customer does not desire to repair the vehicle. The loss reporting channel transmits the photos and other information to the VDC and the ECS.

The VDC analyzes the photos and other information to confirm that the vehicle damage is light. The VDC then writes an estimate for the damage. The VDC transmits the estimate to the ECS. The ECS creates a claim based on the photos and the estimate. The ECS creates and transmits a message to the customer that includes an estimate notice and repair process information. In some embodiments, the customer may determine whether or not to repair the vehicle based on this information. The ECS runs a rules engine to analyze the claim and create a payment. The ECS sends the estimate and the payment electronically to the customer. The ECS closes the claim if appropriate.

Additional Exemplary User Interfaces

Figure 12:
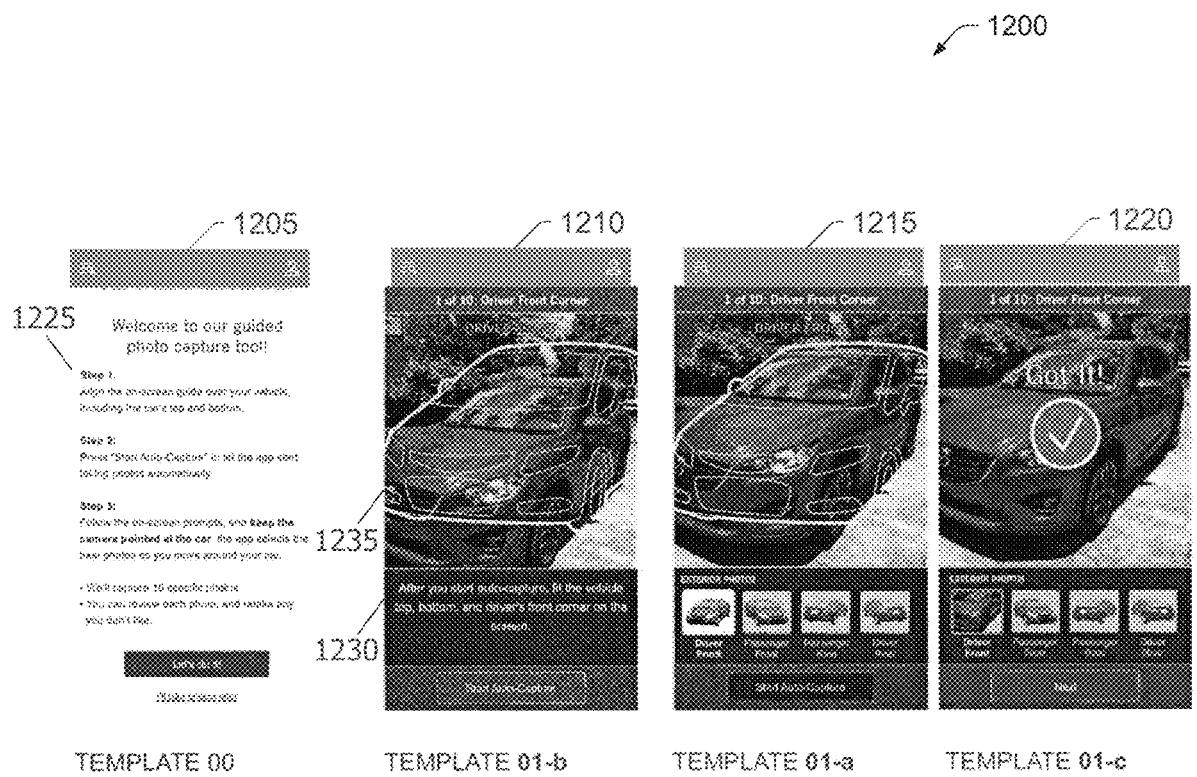
FIGS. 12-21 depict, inter alia, exemplary templates for auto capture of vehicle images or points of interest via a mobile device once a user initiates a continuous capture process.

FIGS. 12-21 depict, inter alia, exemplary templates for auto capture of vehicle images or points of interest via a mobile device once a user initiates a continuous capture process. As shown, FIG. 12 depicts initial templates for a guided photo capture tool. The user is instructed to align an on-screen guide over their vehicle, and then press a "Start Auto Capture" icon on their mobile device to initiate the process and let the app start taking photos automatically. The user is further instructed to follow the on-screen prompts, and keep the mobile device camera pointed at the car to allow the app to automatically select the best images, such as images of the best image quality or image resolution or image lighting, as the user moves around the vehicle. In one embodiment, the app takes 10 specific photos of an area or point of interest, such as the Driver Front Corner shown in FIG. 12, and allows the user to review each photo and retake any that they don't like.

FIG. 12 illustrates a plurality of views of an exemplary user interface 1200 for capturing images of the front driver side corner of a vehicle, such as the vehicle 100 shown in FIG. 1 using the system 400 shown in FIG. 4. In the exemplary embodiment, user interface 1200 is displayed on user computer device 405 (shown in FIG. 4). In the exemplary embodiment, user interface 1200 may be similar to user interface 800 (shown in FIG. 8).

A first view 1205 of user interface 1200 contains instructions 1225 to the user 110. In first view 1205, these instructions 1225 tell the user, such as user 110 (shown in FIG. 1) how to begin the process of capturing images of the damage to an object. After the user 110 presses the button in the first view 1205, the user interface 1200 proceeds to the second view 1210 which contains instructions 1230 to user 110 to proceed to center the camera on the driver's front corner of vehicle 100 and press the button to begin. In the exemplary embodiment, user 110 presses the button only once to start the process of capturing images. In this embodiment, the user 110 presses the button and moves the camera 115 to different positions as described herein. Second view 1210 also contains an overlay 1235 of vehicle 100 to guide the user 110 into getting the correct view of the vehicle 100 for the image. The overlay 1235 is meant to be aligned with the actual vehicle 100 by having the user 110 move the camera 115 to the appropriate position and angle. In the exemplary embodiment, the overlay 1235 is based on the vehicle itself, where the overlay 1235 matches the make and model of the vehicle 100. In some embodiments, the information about the vehicle 100 is taken from the information that the user 110 provided when reporting the loss 205 (shown in FIG. 2). When the overlay 1235 is correctly positioned so that the vehicle in the live image matches the overlay and is thereby properly framed, the system 400 saves the picture. Views 1215 and 1220 illustrate the user 110 adjusting position to match the overlay 1235 and providing feedback when the image is properly framed and saved.

Figure 13:

FIG. 13 illustrates a plurality of views of an exemplary user interface 1300 for capturing images of the front passenger side corner of a vehicle, such as the vehicle 100 shown in FIG. 1 using the system 400 shown in FIG. 4. In the exemplary embodiment, user interface 1300 is displayed on user computer device 405 (shown in FIG. 4). In the exemplary embodiment, user interface 1300 may be similar to user interface 800 (shown in FIG. 8).

A first view 1305 of user interface 1300 contains instructions 1320 to the user and an overlay 1325. In first view 1305, these instructions 1320 tell the user, such as user 110 (shown in FIG. 1), to center the camera on the passenger front corner of vehicle 100. First view 1305 also contains an overlay 1325 of vehicle 100 to guide the user 110 into getting the correct view of the vehicle 100 for the image. When the overlay 1325 is correctly positioned so that the vehicle in the live image matches the overlay and is thereby properly framed, the system 400 saves the picture. Views 1310 and 1315 illustrate the user 110 adjusting position to match the overlay 1325 and providing feedback when the image is properly framed and saved.

Figure 14:
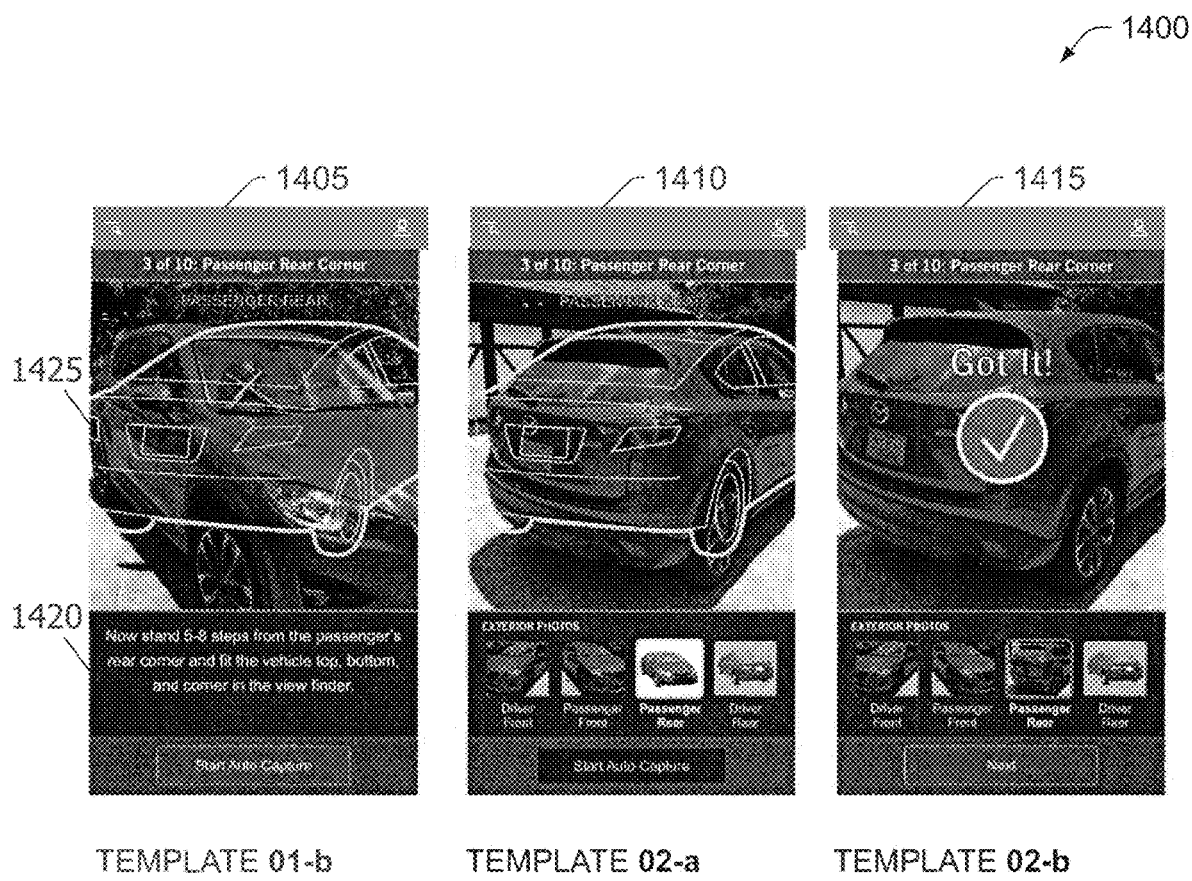

FIG. 14 illustrates a plurality of views of an exemplary user interface 1400 for capturing images of the rear passenger side corner of a vehicle, such as the vehicle 100 shown in FIG. 1 using the system 400 shown in FIG. 4. In the exemplary embodiment, user interface 1400 is displayed on user computer device 405 (shown in FIG. 4). In the exemplary embodiment, user interface 1400 may be similar to user interface 800 (shown in FIG. 8).

A first view 1405 of user interface 1400 contains instructions 1420 to the user and an overlay 1425. In first view 1405, these instructions 1420 tell the user, such as user 110 (shown in FIG. 1), to center the camera on the passenger rear corner of vehicle 100. First view 1405 also contains an overlay 1425 of vehicle 100 to guide the user 110 into getting the correct view of the vehicle 100 for the image. When the overlay 1425 is correctly positioned so that the vehicle in the live image matches the overlay and is thereby properly framed, the system 400 saves the picture. Views 1410 and 1415 illustrate the user 110 adjusting position to match the overlay 1425 and providing feedback when the image is properly framed and saved.

Figure 15:
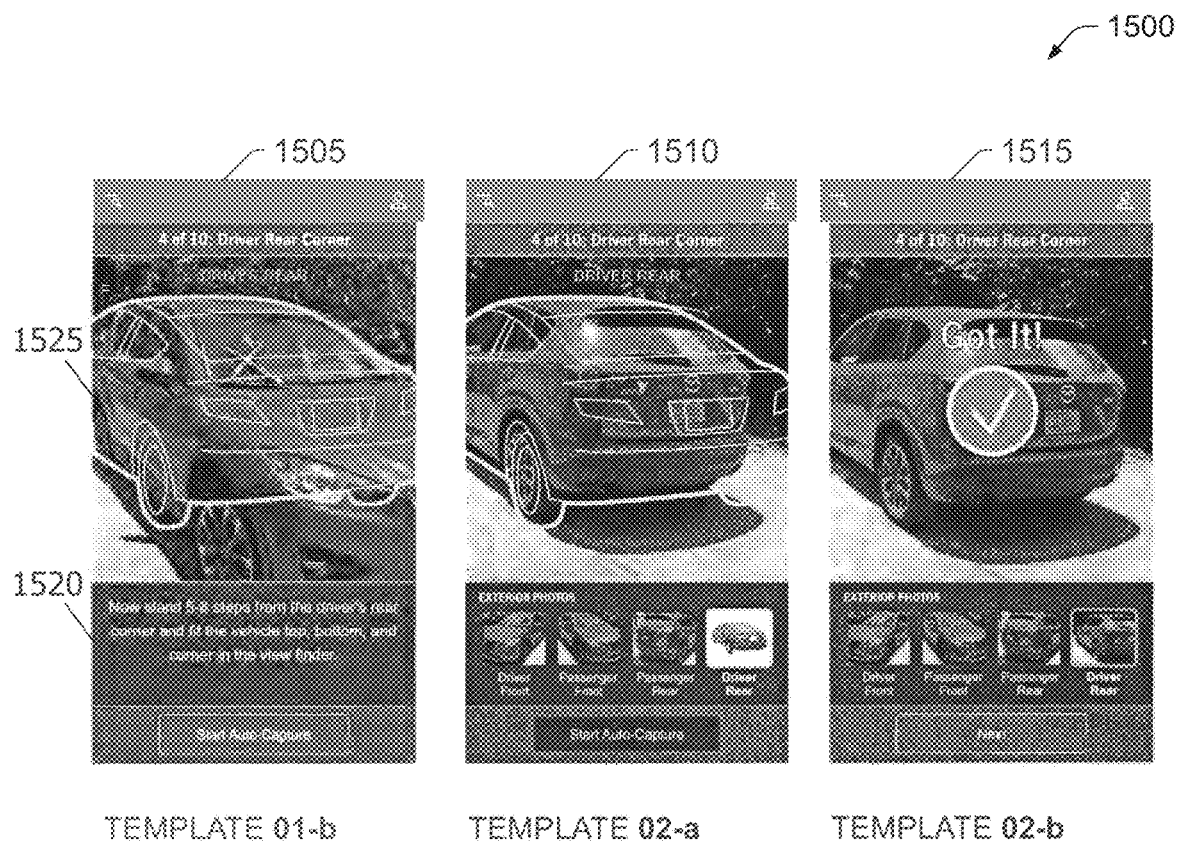

FIG. 15 illustrates a plurality of views of an exemplary user interface 1500 for capturing images of the rear driver side corner of a vehicle, such as the vehicle 100 shown in FIG. 1 using the system 400 shown in FIG. 4. In the exemplary embodiment, user interface 1500 is displayed on user computer device 405 (shown in FIG. 4). In the exemplary embodiment, user interface 1500 may be similar to user interface 800 (shown in FIG. 8).

A first view 1505 of user interface 1500 contains instructions 1520 to the user and an overlay 1525. In first view 1505, these instructions 1520 tell the user, such as user 110 (shown in FIG. 1), to center the camera on the driver rear corner of vehicle 100. First view 1505 also contains an overlay 1525 of vehicle 100 to guide the user 110 into getting the correct view of the vehicle 100 for the image. When the overlay 1525 is correctly positioned so that the vehicle in the live image matches the overlay and is thereby properly framed, the system 400 saves the picture. Views 1510 and 1515 illustrate the user 110 adjusting position to match the overlay 1525 and providing feedback when the image is properly framed and saved.

Figure 16:
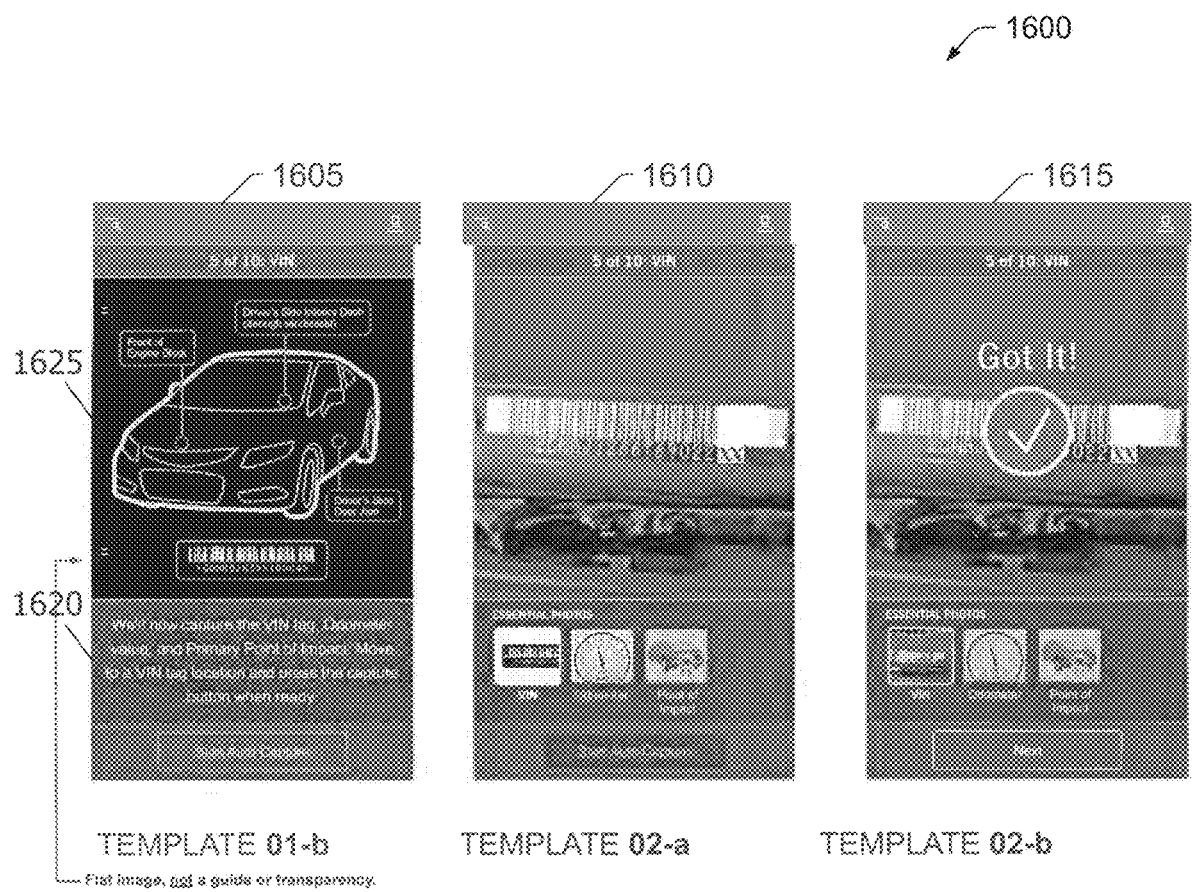

FIG. 16 illustrates a plurality of views of an exemplary user interface 1600 for capturing images of the Vehicle Identification Number (VIN) of a vehicle, such as the vehicle 100 shown in FIG. 1 using the system 400 shown in FIG. 4. In the exemplary embodiment, user interface 1600 is displayed on user computer device 405 (shown in FIG. 4). In the exemplary embodiment, user interface 1600 may be similar to user interface 800 (shown in FIG. 8).

A first view 1605 of user interface 1600 contains instructions 1620 to the user. In first view 1605, these instructions 1620 tell the user, such as user 110 (shown in FIG. 1), to center the camera on the VIN of vehicle 100. When the camera is correctly positioned so that the vehicle in the live image is properly framed, the system 400 saves the picture. Views 1610 and 1615 illustrate the user 110 adjusting position and providing feedback when the image is properly framed and saved.

Figure 17:
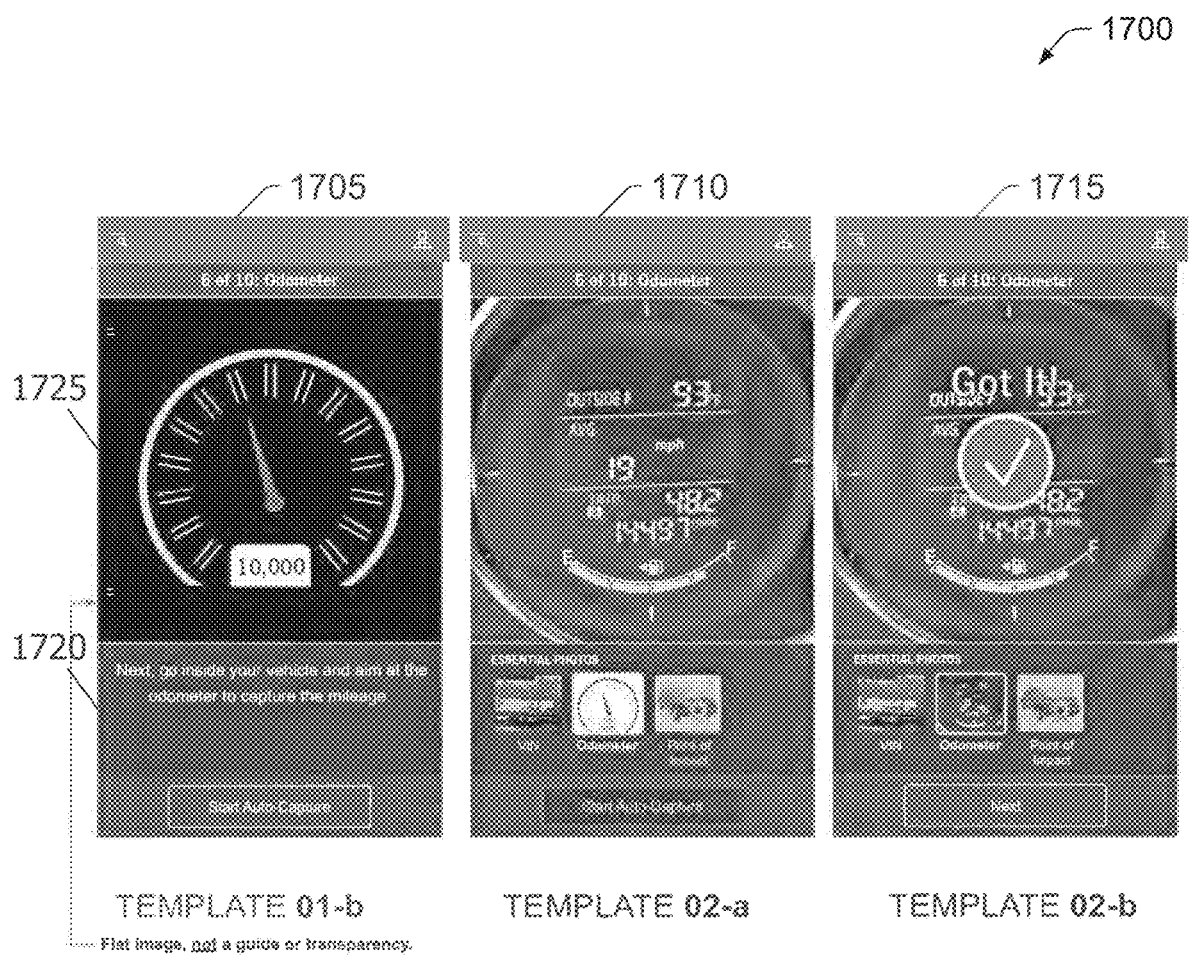

FIG. 17 illustrates a plurality of views of an exemplary user interface 1700 for capturing images of the odometer of a vehicle, such as the vehicle 100 shown in FIG. 1 using the system 400 shown in FIG. 4. In the exemplary embodiment, user interface 1700 is displayed on user computer device 405 (shown in FIG. 4). In the exemplary embodiment, user interface 1700 may be similar to user interface 800 (shown in FIG. 8).

A first view 1705 of user interface 1700 contains instructions 1720 to the user. In first view 1705, these instructions 1720 tell the user, such as user 110 (shown in FIG. 1), to center the camera on the odometer of vehicle 100. When the camera is correctly positioned so that the vehicle in the live image matches the overlay and is thereby properly framed, the system 400 saves the picture. Views 1710 and 1715 illustrate the user 110 adjusting position and providing feedback when the image is properly framed and saved.

Figure 18:
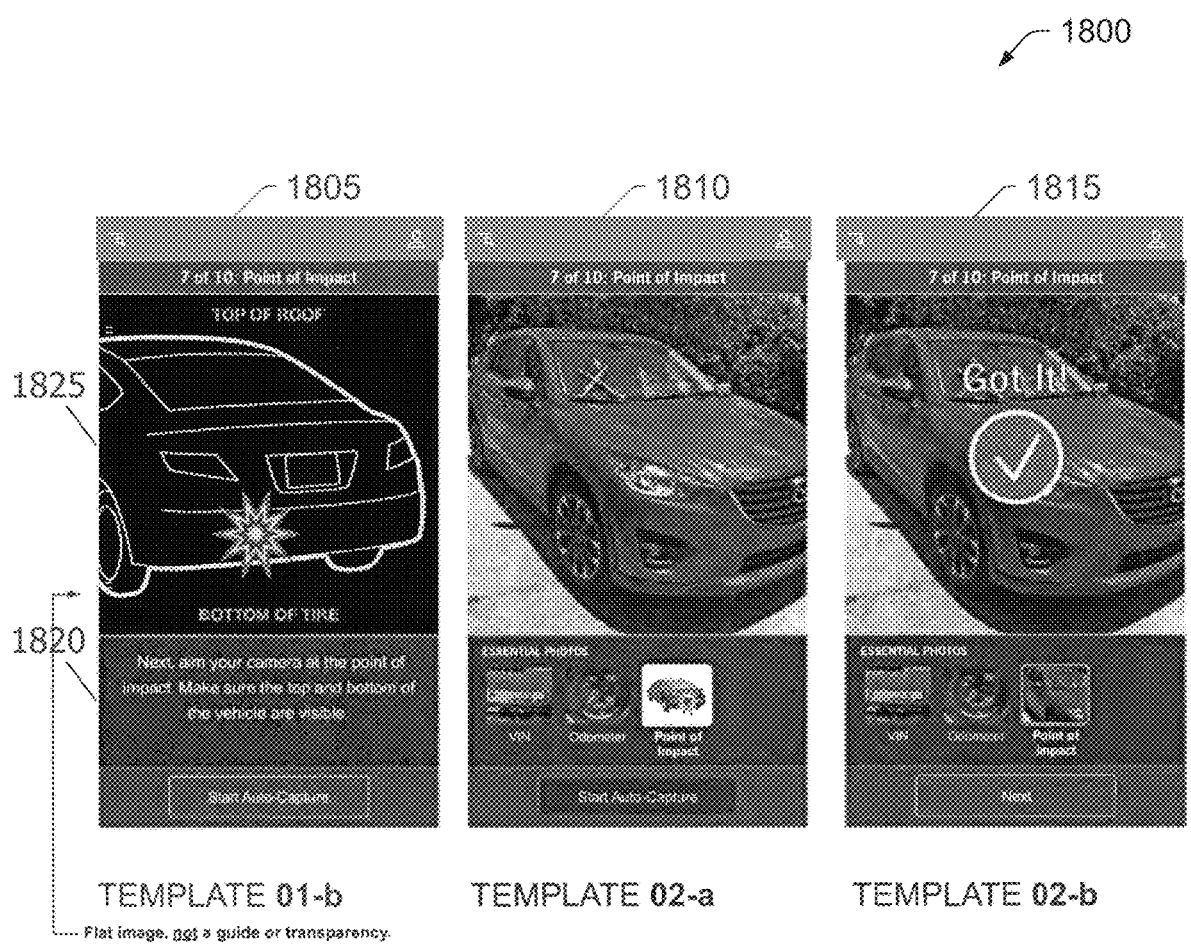

FIG. 18 illustrates a plurality of views of an exemplary user interface 1800 for capturing images of the point of impact or damage of a vehicle, such as the vehicle 100 shown in FIG. 1 using the system 400 shown in FIG. 4. In the exemplary embodiment, user interface 1800 is displayed on user computer device 405 (shown in FIG. 4). In the exemplary embodiment, user interface 1800 may be similar to user interface 800 (shown in FIG. 8).

A first view 1805 of user interface 1800 contains instructions 1820 to the user. In first view 1805, these instructions 1820 tell the user, such as user 110 (shown in FIG. 1), to center the camera on the point of image or damage of vehicle 100. When the camera is correctly positioned so that the vehicle in the live image is properly framed, the system 400 saves the picture. Views 1810 and 1815 illustrate the user 110 adjusting position and providing feedback when the image is properly framed and saved.

Figure 19:
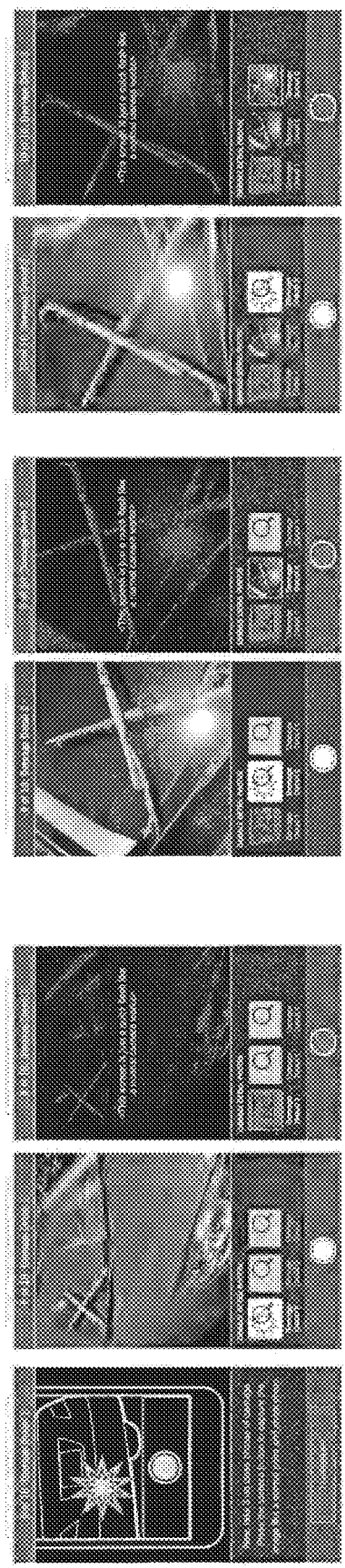

FIG. 19 illustrates a plurality of views of an exemplary user interface 1900 for capturing a plurality of images of the damage to a vehicle, such as the vehicle 100 shown in FIG. 1 using the system 400 shown in FIG. 4. In the exemplary embodiment, user interface 1900 is displayed on user computer device 405 (shown in FIG. 4). In the exemplary embodiment, user interface 1900 may be similar to user interface 800 (shown in FIG. 8). In some embodiments, the user presses a button to take each picture. In other embodiments, the system 400 continuously takes pictures of the damage as the user moves the camera.

Figure 20:
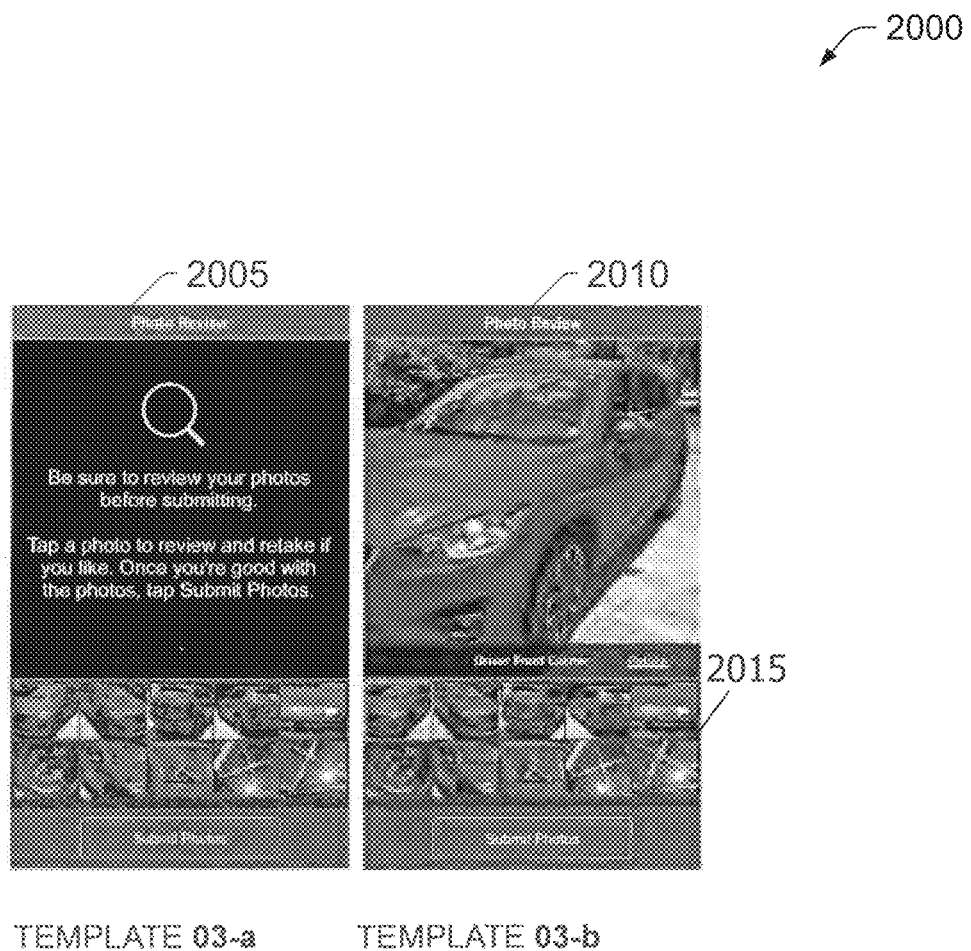

FIG. 20 illustrates a plurality of views of an exemplary user interface 2000 for reviewing captured images of a vehicle, such as the vehicle 100 shown in FIG. 1 using the system 400 shown in FIG. 4. In the exemplary embodiment, user interface 2000 is displayed on user computer device 405 (shown in FIG. 4). In the exemplary embodiment, user interface 2000 may be similar to user interface 800 (shown in FIG. 8).

A first view 2005 of user interface 2000 contains instructions to the user. In first view 2005, these instructions tell the user, such as user 110 (shown in FIG. 1), to review the photos before submitting. First view 2005 also includes a thumbnail pane 2015 that includes thumbnails of the photos that have been taken. The user 110 may click on one of the thumbnails in the thumbnail pane 2015 to view the associated image, as shown in second view 2010. The user interface 2000 also allows the user 110 to retake any photo that the user 110 wishes.

Figure 21:
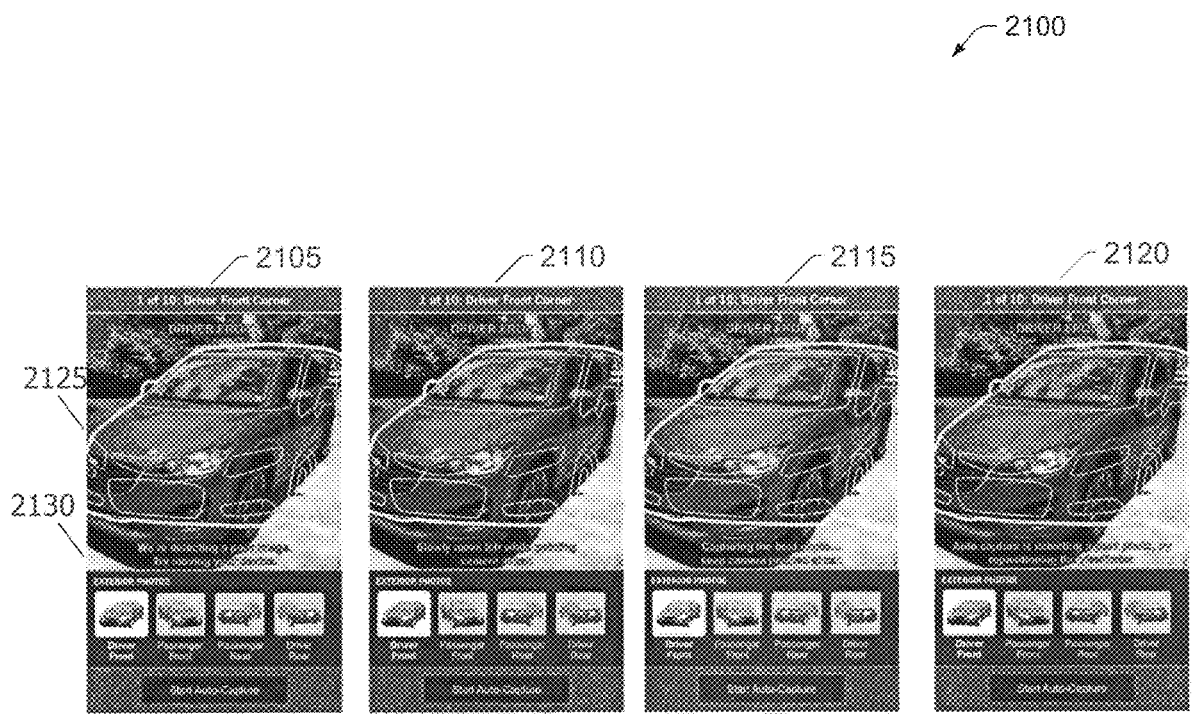

FIG. 21 illustrates a plurality of views of an exemplary user interface 2100 with a feedback system for capturing images of a vehicle, such as the vehicle 100 shown in FIG. 1 using the system 400 shown in FIG. 4. In the exemplary embodiment, user interface 2100 is displayed on user computer device 405 (shown in FIG. 4). In the exemplary embodiment, user interface 2100 may be similar to user interface 800 (shown in FIG. 8).

A first view 2105 of user interface 2100 contains instructions 2130 to the user. In first view 2105, these instructions 2130 tell the user, such as user 110 (shown in FIG. 1), to how to position themselves and/or the camera to properly frame the image of the vehicle 100 and get overlay 2125 into the right position. As the user 110 moves, user interface 2100 updates the instructions 2130 based on the current situation, as shown in second view 2110, third view 2115, and fourth view 2120. In some embodiments, overlay 2125 is not displayed when the user is receiving instructions 2130.

Exemplary Embodiments & Functionality

In one aspect, a computer system for model-based analysis of damage to an object may be provided. The computer system may include at least one processor in communication with at least one memory device. The at least one processor may be configured or programmed to: (1) receive, from a user, a request for an estimate to repair an object, where the object may be a vehicle; (2) receive a plurality of images of the object to repair, including at least one image of damage to the object; (3) analyze the plurality of images in comparison to a plurality of models; (4) determine an amount of damage to the object based upon the analysis; and/or (5) determine a time to repair the object based upon the amount of damage.

A further enhancement may be where the computer system may determine whether the time to repair exceeds a first threshold. If the time to repair the object does not exceed the first threshold, the computer system may calculate a cost to repair the object. The computer system may also categorize the damage as light damage.

If the time to repair exceeds the first threshold, the computer system may determine whether the time to repair exceeds a second threshold. If the time to repair exceeds the first threshold, but does not exceed the second threshold, the computer system may categorize the damage as medium damage. If the time to repair exceeds both the first threshold and the second threshold, the computer system may categorize the damage as heavy damage. If the damage is medium damage or heavy damage, the computer system may instruct the user to take the object to a repair facility for an estimate.

A further enhancement may be where the computer system determines whether the user desires to repair the damage. If the damage is light damage and the user desires to repair the damage, the computer system may determine a repair facility to repair the object. The computer system may also schedule an appointment to repair the object with the repair facility. In some further enhancements, the computer system may transfer the cost to repair the object to an account associated with the repair facility. The computer system may further transfer the plurality of images to the repair facility. A further enhancement may be where the computer system determines that the damage is light damage and that the user does not wish to repair the damage, then the computer system may transfer the cost to repair the object to an account associated with the user.

The computer system may achieve the above results by determining whether the plurality of images properly display the object and the damage. The computer system may compare the plurality of images to one or more models to determine whether the plurality of images properly display the object and the damage. If the plurality of images does not properly display at least one of the object and the damage, the computer system may determine that one or more additional images are needed. In response to this determination, the computer system may transmit an image request to the user for the one or more additional images. In the image request, the computer system may request specific images taken at specific angles and distances from the object.

In another aspect, a computer system for capturing images of the damage to a vehicle may be provided. The computer system may include at least one processor in communication with at least one memory device. The at least one processor may be configured or programmed to: (1) store an orientation model associated with an object; (2) receive, from a user, a request to analyze damage to an object; (3) instruct the user to position a camera at a first position relative to the object; (4) receive an image of the object from the camera; (5) determine whether the received image is properly framed; (6) if the received image is not properly framed, instruct the user to adjust the position of the camera; and/or (7) if the received image is properly framed, instruct the user to position the camera at a second position relative to the object to facilitate capturing the proper images.

An enhancement may be where the camera is associated with a mobile computer device associated with the user. A further enhancement may be where the request to analyze damage to the object includes at least one of: a type of the object, a model of the object, one or more identifying pieces of data about the object, and one or more identifying pieces of data about the user. Another enhancement many be where the object is a vehicle and where the request to analyze damage to the object includes one or more of a make of the vehicle, a model of the vehicle, a year of the vehicle, a location of the damage on the vehicle, identification of the vehicle, and identification of the user.

The computer system may achieve the above results by storing a plurality of orientation models of objects. The computer system may then determine an orientation model of the plurality of orientation models associated with the object based upon the request to analyze damage to the object. The computer system may further determine a plurality of views of the object necessary to analyze the object and/or the damage based upon the orientation model. The computer system may also determine a first view of the plurality of views based upon the damage and the orientation model. In addition, the computer system may determine the first position for the camera based upon the first view.

The computer system may achieve the above results by comparing the received image with the orientation model to determine if the received image captures the first view. The computer system may also determine an amount of variation between the received image and the first view. The computer system may further provide feedback to the user based upon the amount of variation. In addition, the computer system may store one or more damage classification models. Moreover, the computer system may determine the plurality of views of the object necessary to analyze the object and/or the damage based upon the orientation model and the one or more damage classification models.

A further enhancement may be where the computer system repeatedly receives images from the camera until the received image is properly framed. A further enhancement may be where the computer system provides negative feedback to the user if the received image is not properly framed. The computer system may provide positive feedback to the user if the received image is properly framed.

A still further enhancement may be where the computer system continuously receives images from the camera. The computer system may also continuously provide feedback to the user about if the received image is properly framed.

A further enhancement may be where the plurality of views includes at least one view of an identifier of the object, and where the identifier includes at least one of a license plate and a vehicle identification number.

In another aspect, a computer-implemented method for capturing images of damage to an object may be provided. The method may be implemented on a damage analysis ("DA") computer system including at least one processor in communication with at least one memory device. The method may include: (1) storing, in the memory device, an orientation model associated with an object; (2) receiving, from a user, a request to analyze damage to the object; (3) instructing, by the processor, the user to position a camera at a first position relative to the object; (4) receiving, from the camera, a first image of the object; (5) determining, by the processor, whether the first image is properly framed using the orientation model; (6) if the first image is not properly framed, instructing the user to adjust the position of the camera; and/or (7) if the first image is properly framed, instructing the user to position the camera at a second position relative to the object to facilitate capturing the proper images.

A further enhancement to the computer-implemented method may include where the first image is properly framed if it captures the first view by comparing the received image with the orientation model to determine if the received image captures the first view.

A further enhancement to the computer-implemented method may include where the first image is properly framed if it captures the first view, where the method may determine an amount of variation between the received image and the first view and may provide feedback to the user based upon the amount of variation.

A further enhancement to the computer-implemented method may include storing one or more damage classification models and determining the plurality of views of the object necessary to analyze the object and/or the damage based upon the orientation model and the one or more damage classification models.

A further enhancement to the computer-implemented method may include repeatedly receiving images from the camera until the received image is properly framed.

A further enhancement to the computer-implemented method may include providing negative feedback to the user if the first image is not properly framed.

A further enhancement to the computer-implemented method may include providing positive feedback to the user if the first image is properly framed.

A further enhancement to the computer-implemented method may include continuously receiving images from the camera.

A further enhancement to the computer-implemented method may include continuously providing feedback to the user about if the first image is properly framed.

A further enhancement to the computer-implemented method may include where the plurality of views includes at least one view of an identifier of the object, and where the identifier includes at least one of a license plate and a vehicle identification number.

A further enhancement to the computer-implemented method may include where the camera is associated with a mobile computer device associated with the user.

In another aspect, at least one non-transitory computer-readable storage media having computer-executable instructions embodied thereon may be provided. When executed by at least one processor, the computer-executable instructions may cause the processor to: (1) store an orientation model associated with an object; (2) receive, from a user, a request to analyze damage to an object; (3) instruct the user to position a camera at a first position relative to the object; (4) receive a first image of the object from the camera; (5) determine whether the first image is properly framed using the orientation model; (6) if the first image is not properly framed, instruct the user to adjust the position of the camera; and/or (7) if the first image is properly framed, instruct the user to position the camera at a second position relative to the object to facilitate capturing the proper images.

A further enhancement to the computer-readable storage media may include where the request to analyze damage to the object includes at least one of: a type of the object, a model of the object, one or more identifying pieces of data about the object, and one or more identifying pieces of data about the user.

A further enhancement to the computer-readable storage media may include where the object is a vehicle and where the request to analyze damage to the object includes one or more of a make of the vehicle, a model of the vehicle, a year of the vehicle, a location of the damage on the vehicle, identification of the vehicle, and identification of the user.

A further enhancement to the computer-readable storage media may include where the computer-executable instructions may cause the processor to store a plurality of orientation models of objects and determine an orientation model of the plurality of orientation models associated with the object based upon the request to analyze damage to the object.

A further enhancement to the computer-readable storage media may include where the computer-executable instructions may cause the processor to determine a plurality of views of the object necessary to analyze the object and/or the damage based upon the orientation model, determine a first view of the plurality of views based upon the damage and the orientation model, and determine the first position for the camera based upon the first view.

A further enhancement to the computer-readable storage media may include where the first image is properly framed if it captures the first view, where the computer-executable instructions may cause the processor to compare the received image with the orientation model to determine if the received image captures the first view.

A further enhancement to the computer-readable storage media may include where the computer-executable instructions may cause the processor to determine an amount of variation between the received image and the first view and provide feedback to the user based upon the amount of variation.

A further enhancement to the computer-readable storage media may include where the computer-executable instructions may cause the processor to store one or more damage classification models and determine the plurality of views of the object necessary to analyze the object and/or the damage based upon the orientation model and the one or more damage classification models.

A further enhancement to the computer-readable storage media may include where the computer-executable instructions may cause the processor to repeatedly receive images from the camera until the received image is properly framed.

A further enhancement to the computer-readable storage media may include where the computer-executable instructions may cause the processor to provide negative feedback to the user if the first image is not properly framed.

A further enhancement to the computer-readable storage media may include where the computer-executable instructions may cause the processor to provide positive feedback to the user if the first image is properly framed.

A further enhancement to the computer-readable storage media may include where the computer-executable instructions may cause the processor to continuously receive images from the camera.

A further enhancement to the computer-readable storage media may include where the computer-executable instructions may cause the processor to continuously provide feedback to the user about if the first image is properly framed.

A further enhancement to the computer-readable storage media may include where the plurality of views includes at least one view of an identifier of the object, and where the identifier includes at least one of a license plate and a vehicle identification number.

A further enhancement to the computer-readable storage media may include where the camera is associated with a mobile computer device associated with the user.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, historical estimates, and/or actual repair costs. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the object, vehicle, user, damage, needed repairs, costs and/or incident from vehicle data, insurance policies, geolocation data, image data, and/or other data.

Based upon these analyses, the processing element may learn how to identify characteristics and patterns that may then be applied to analyzing image data, model data, and/or other data. For example, the processing element may learn, with the user's permission or affirmative consent, to identify the type of incident that occurred based upon images of the resulting damage. The processing element may also learn how to identify damage that may not be readily visible based upon the received image data.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A computer system for capturing images of damage to an object, the computer system including at least one processor in communication with at least one memory device, the at least one processor is programmed to:
   store an orientation model associated with an object;
   receive, from a user, a request to analyze damage to the object;
   determine a plurality of views of the object for analyzing the object and the damage based upon the orientation model;
   determine a first view of the plurality of views based upon the damage and the orientation model;
   determine a first position for a camera based upon the first view;
   instruct the user to position the camera at the first position relative to the object;
   receive an image of the object from the camera;
   determine whether the received image is properly framed using the orientation model;
   if the received image is not properly framed, instruct the user to adjust the position of the camera; and
   if the received image is properly framed, instruct the user to position the camera at a second position relative to the object.

2. The computer system of claim 1, wherein the request to analyze damage to the object includes at least one of: a type of the object, a model of the object, one or more identifying pieces of data about the object, and one or more identifying pieces of data about the user.

3. The computer system of claim 1, wherein the object is a vehicle and the request to analyze damage to the object includes one or more of a make of the vehicle, a model of the vehicle, a year of the vehicle, a location of the damage on the vehicle, identification of the vehicle, and identification of the user.

4. The computer system of claim 1, wherein the processor is further programmed to:
   store a plurality of orientation models of objects; and
   determine an orientation model of the plurality of orientation models associated with the object based upon the request to analyze damage to the object.

5. The computer system of claim 1, wherein the received image is properly framed if it captures the first view, wherein the processor is further programmed to compare the received image with the orientation model to determine if the received image captures the first view.

6. The computer system of claim 5, wherein the received image is properly framed if it captures the first view, wherein the processor is further programmed to:
   determine an amount of variation between the received image and the first view; and
   provide feedback to the user based upon the amount of variation.

7. The computer system of claim 1, wherein the processor is further configured to:
   store one or more damage classification models; and
   determine the plurality of views of the object for analyzing the object and the damage based upon the orientation model and the one or more damage classification models.

8. The computer system of claim 1, wherein the processor is further programmed to repeatedly receive images from the camera until the received image is properly framed.

9. The computer system of claim 1, wherein the processor is further programmed to provide negative feedback to the user if the received image is not properly framed.

10. The computer system of claim 1, wherein the processor is further programmed to provide positive feedback to the user if the received image is properly framed.

11. The computer system of claim 1, wherein the processor is further programmed to continuously receive images from the camera.

12. The computer system of claim 11, wherein the processor is further programmed to continuously provide feedback to the user about if the received image is properly framed.

13. The computer system of claim 1, wherein the plurality of views includes at least one view of an identifier of the object, wherein the identifier includes at least one of a license plate and a vehicle identification number.

14. The computer system of claim 1, wherein the camera is associated with a mobile computer device associated with the user.

15. A computer-implemented method for capturing images of damage to an object, the method implemented on a damage analysis ("DA") computer system including at least one processor in communication with at least one memory device, the method comprising:
   storing, in the memory device, an orientation model associated with an object;
   receiving, from a user, a request to analyze damage to the object;
   determining a plurality of views of the object for analyzing the object and the damage based upon the orientation model;
   determining a first view of the plurality of views based upon the damage and the orientation model;
   determining a first position for a camera based upon the first view;
   instructing, by the processor, the user to position the camera at the first position relative to the object;
   receiving, from the camera, an image of the object;

determining, by the processor, whether the received image is properly framed using the orientation model;

if the received image is not properly framed, instructing the user to adjust the position of the camera; and if the received image is properly framed, instructing the user to position the camera at a second position relative to the object.

16. The method of claim 15, wherein the request to analyze damage to the object includes at least one of: a type of the object, a model of the object, one or more identifying pieces of data about the object, and one or more identifying pieces of data about the user.

17. The method of claim 15, wherein the object is a vehicle and the request to analyze damage to the object includes one or more of a make of the vehicle, a model of the vehicle, a year of the vehicle, a location of the damage on the vehicle, identification of the vehicle, and identification of the user.

18. The method of claim 15 further comprising:

storing, in the memory device, a plurality of orientation models of objects; and determining an orientation model of the plurality of orientation models associated with the object based upon the request to analyze damage to the object.

19. The method of claim 15, wherein the received image is properly framed if it captures the first view, wherein the method further comprises comparing the received image with the orientation model to determine if the received image captures the first view.

20. The method of claim 19, wherein the received image is properly framed if it captures the first view, wherein the method further comprises:

determining an amount of variation between the received image and the first view; and providing feedback to the user based upon the amount of variation.

* * * * *